US 6,607,457 B2

(12) United States Patent
Kawakami

(10) Patent No.: US 6,607,457 B2
(45) Date of Patent: Aug. 19, 2003

(54) ASSISTING APPARATUS FOR CHANGING SPEEDS IN A BICYCLE TRANSMISSION

(75) Inventor: Tatsuya Kawakami, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 10/040,053

(22) Filed: Oct. 19, 2001

(65) Prior Publication Data
US 2003/0064841 A1 Apr. 3, 2003

Related U.S. Application Data

(63) Continuation-in-part of application No. 09/971,328, filed on Oct. 3, 2001, now abandoned.

(51) Int. Cl.[7] .............................. F16H 7/22; F16H 9/00
(52) U.S. Cl. .................... 474/80; 74/473.14; 74/473.16
(58) Field of Search .......................... 474/80; 74/502.2, 74/501.6, 473.14, 527, 502.4, 594.6, 473.16, 535, 529, 500.5, 502.6

(56) References Cited

U.S. PATENT DOCUMENTS

| 4,728,316 A | 3/1988 | Darby |
| 4,894,046 A | 1/1990 | Browning |
| 5,358,451 A | 10/1994 | Lacombe et al. |
| 6,443,032 B1 | 9/2002 | Fujii et al. |

FOREIGN PATENT DOCUMENTS

EP 1106496 A2 6/2001

Primary Examiner—David Fenstermacher
Assistant Examiner—Bradley J. VanPelt
(74) Attorney, Agent, or Firm—James A. Deland

(57) ABSTRACT

An assisting apparatus for using power from a rotating member to assist the operation of a bicycle transmission includes a mounting unit and an input transmission member coupled to the mounting unit, wherein the input transmission member moves to at least a first input position, a second input position and a third input position. An output transmission member is coupled to the mounting unit, wherein the output transmission member moves to at least a first output position, a second output position, and a third output position corresponding to the first input position, the second input position and the third input position of the input transmission member, respectively. A rotating member engaging member moves between a rotating member engaging position and a rotating member disengaging position, and a motion transmitting mechanism is provided for transmitting motion from the rotating member engaging member to the output transmission member.

41 Claims, 35 Drawing Sheets

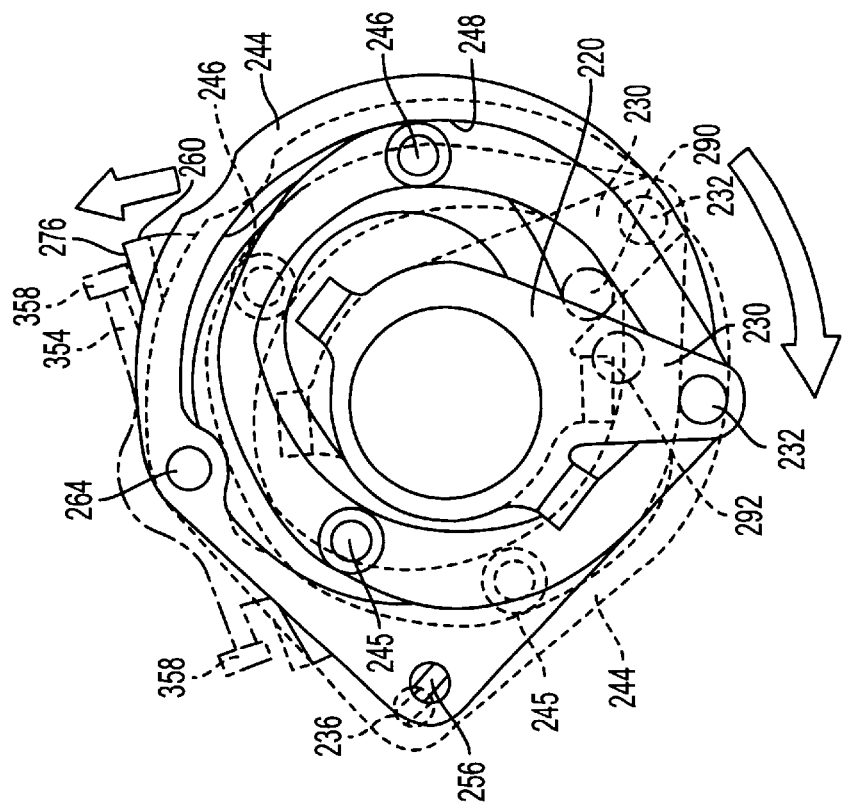
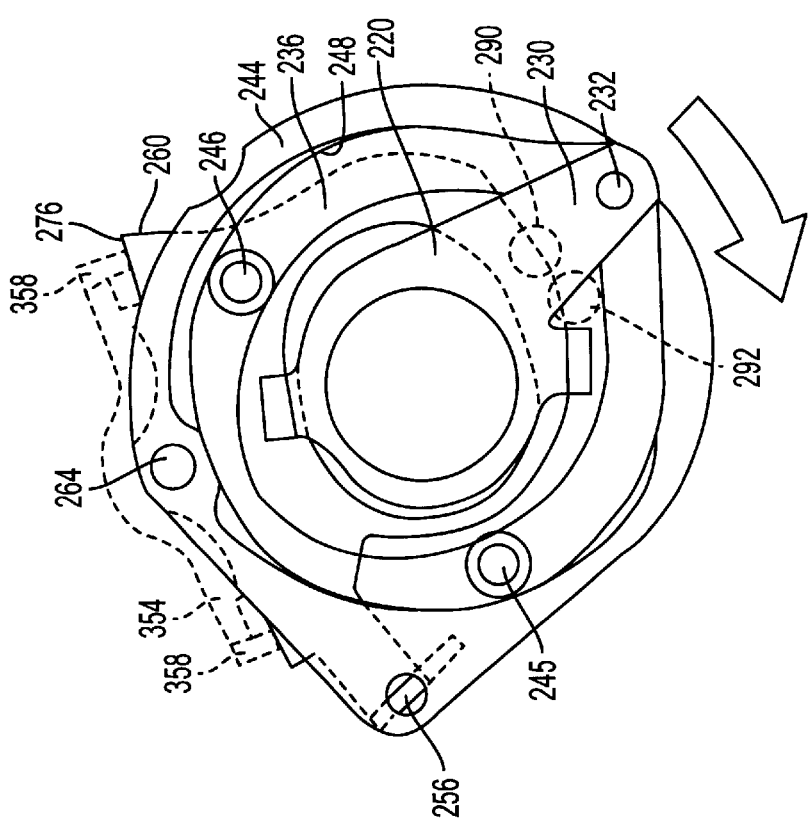

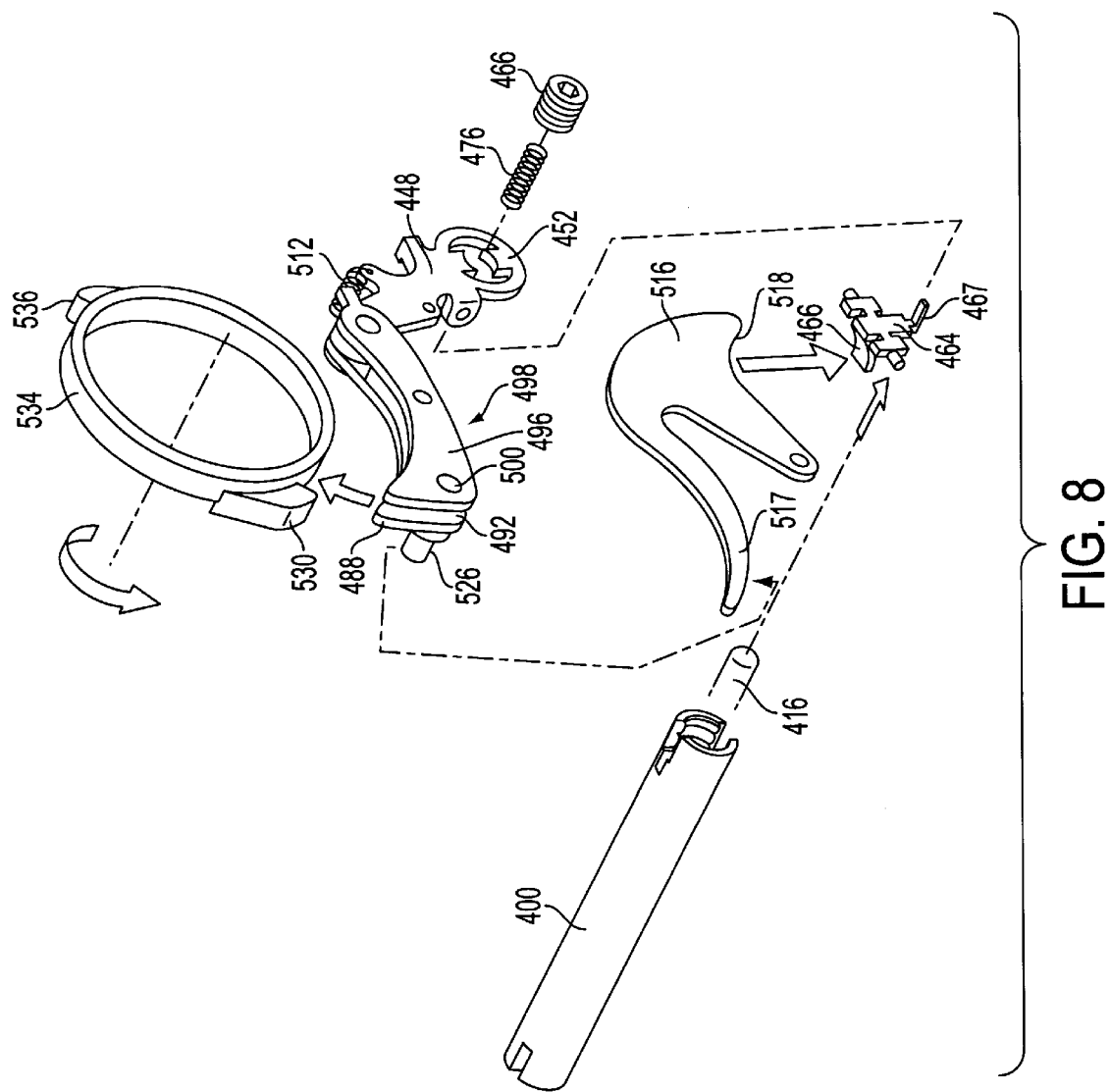

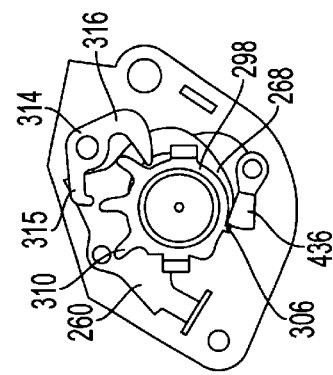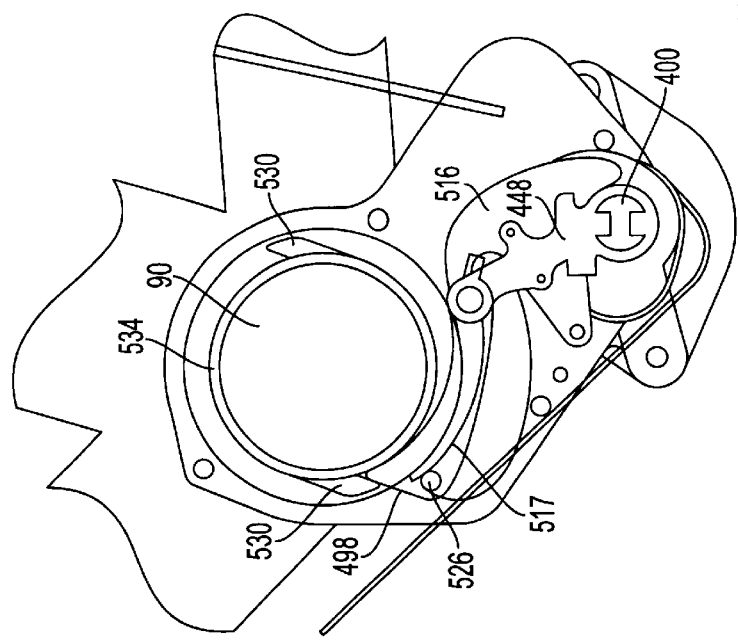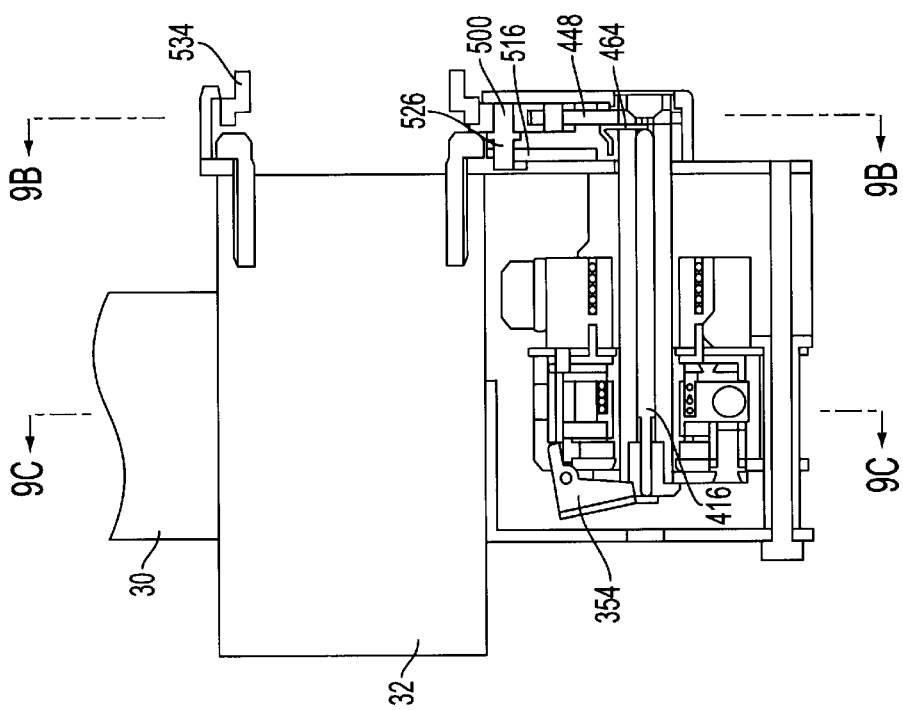

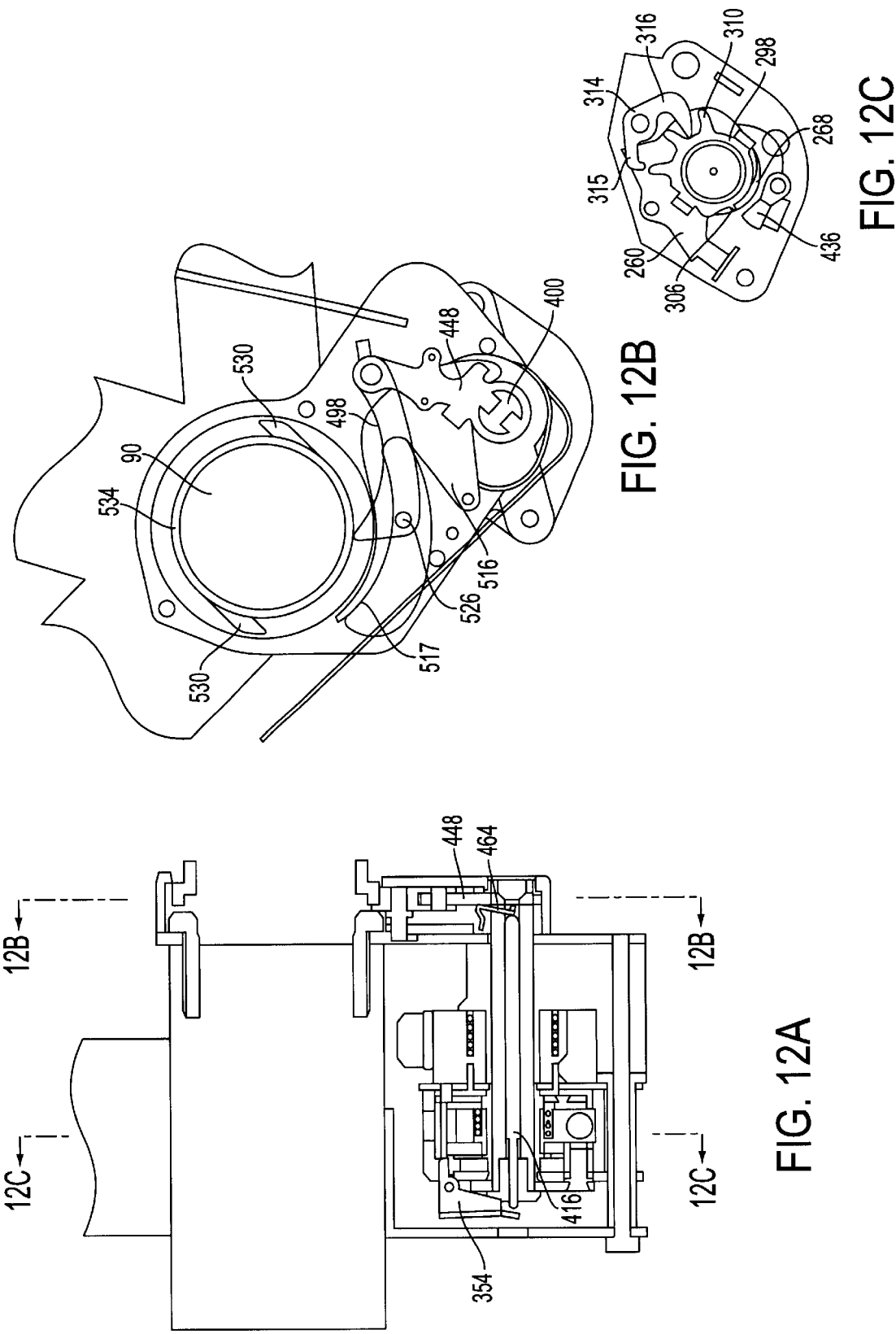

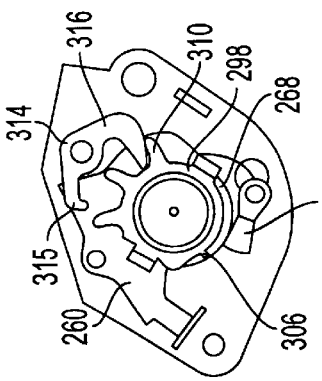
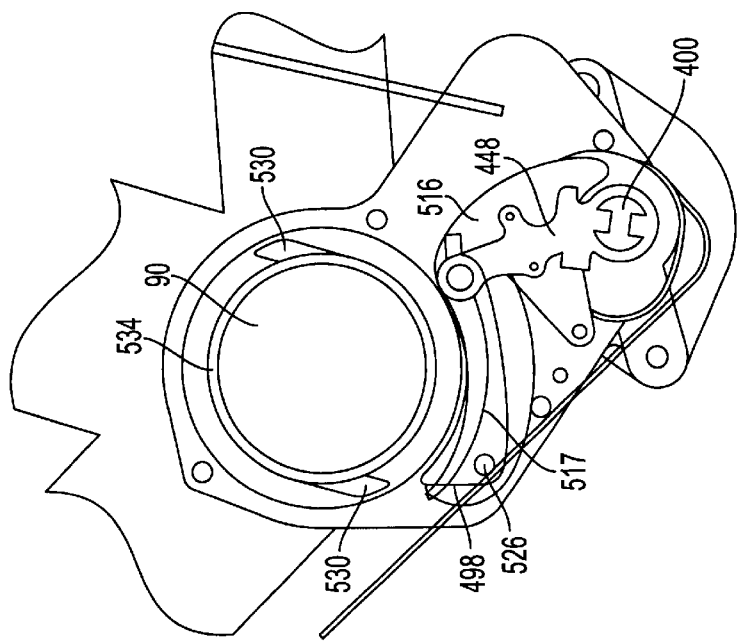
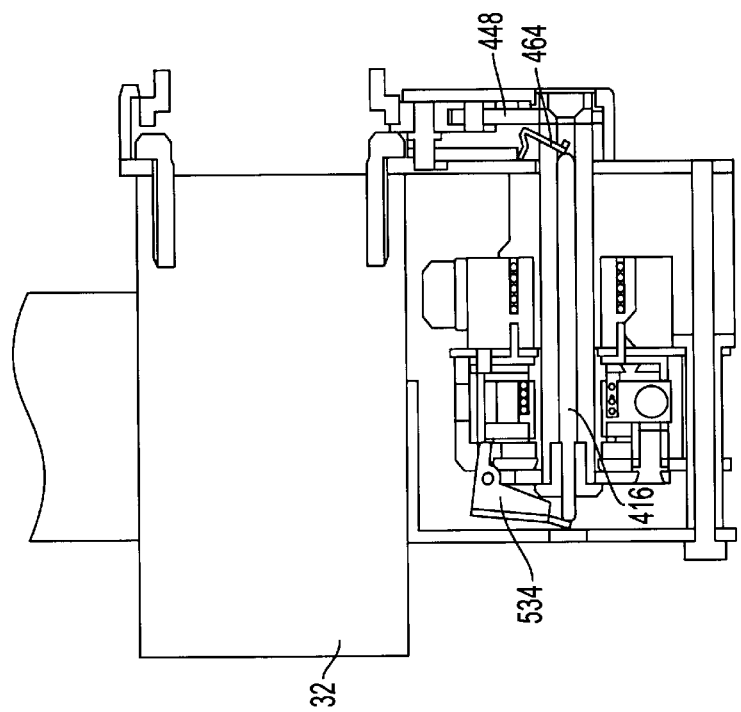

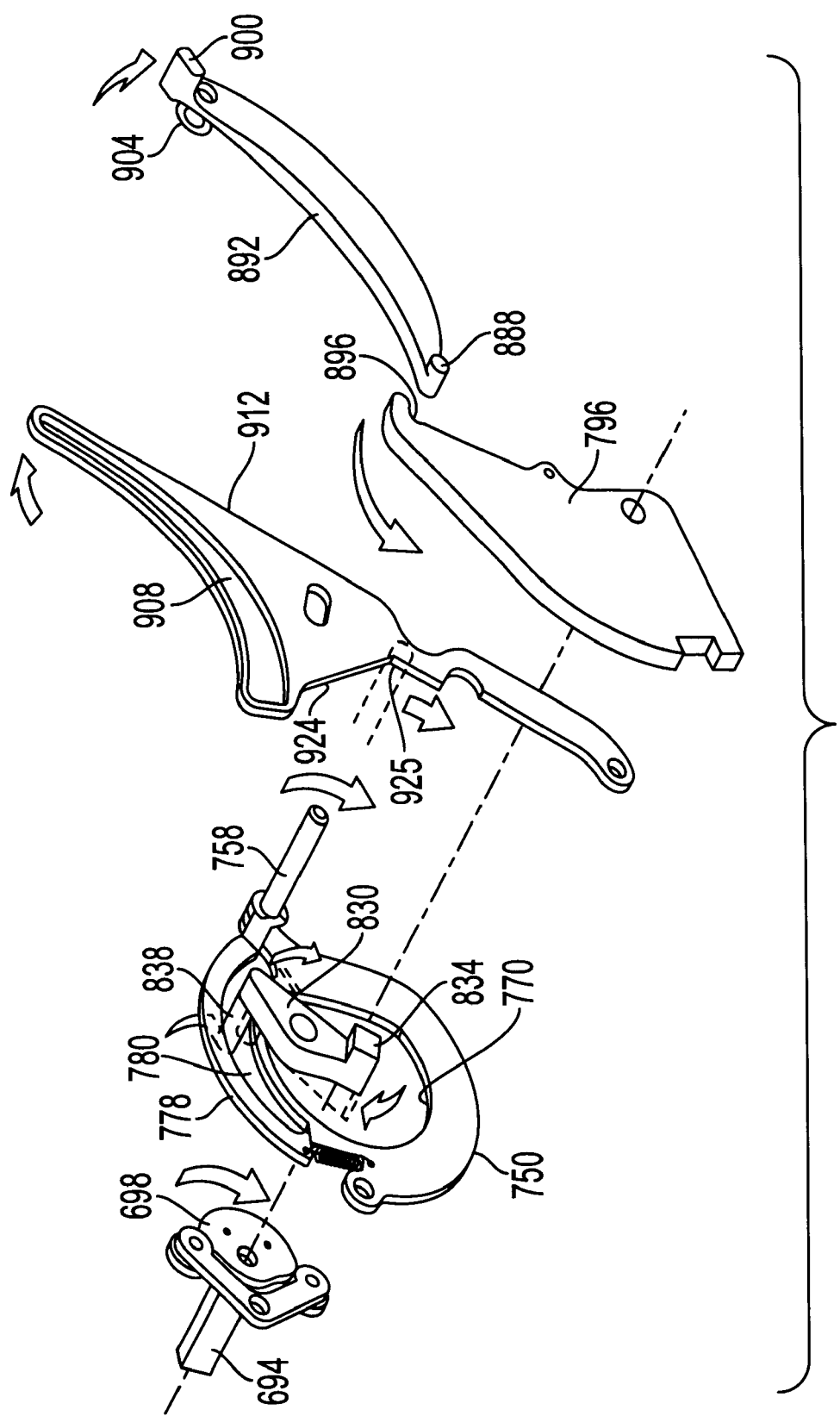

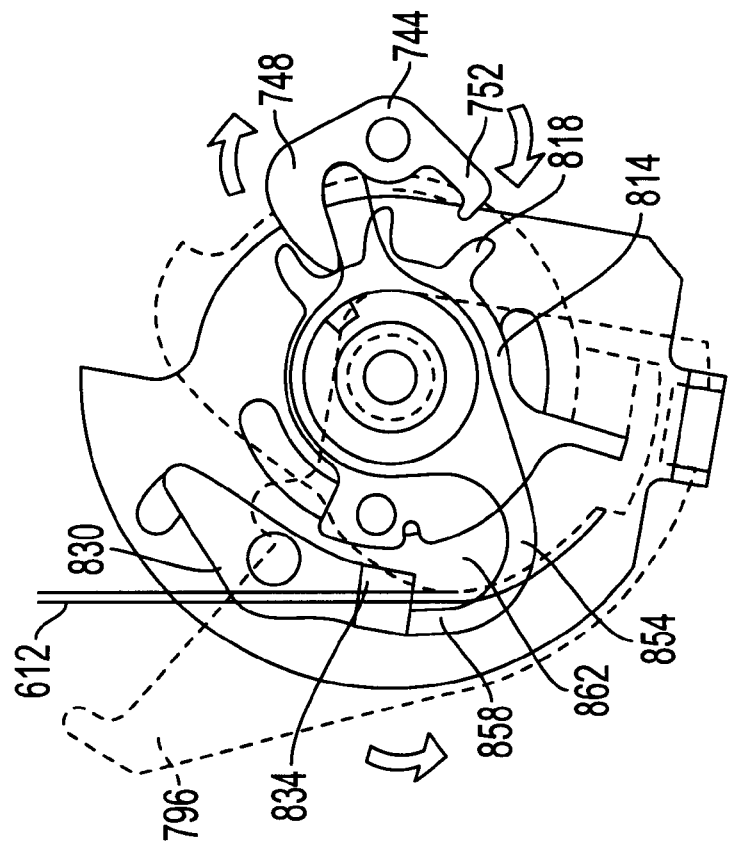
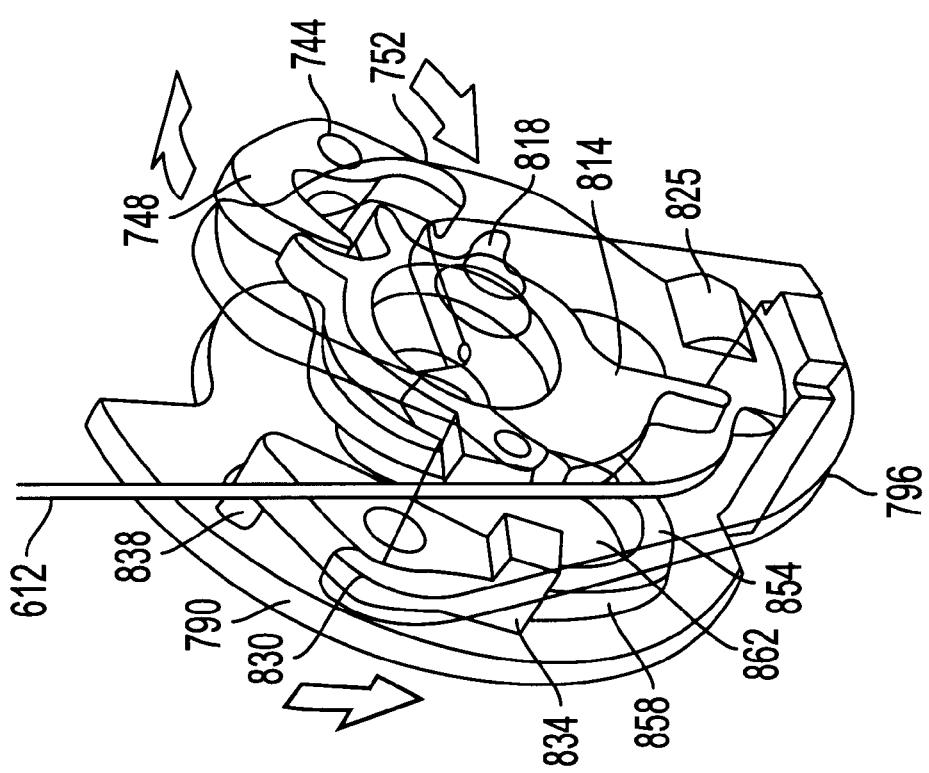
FIG. 30B
FIG. 30A

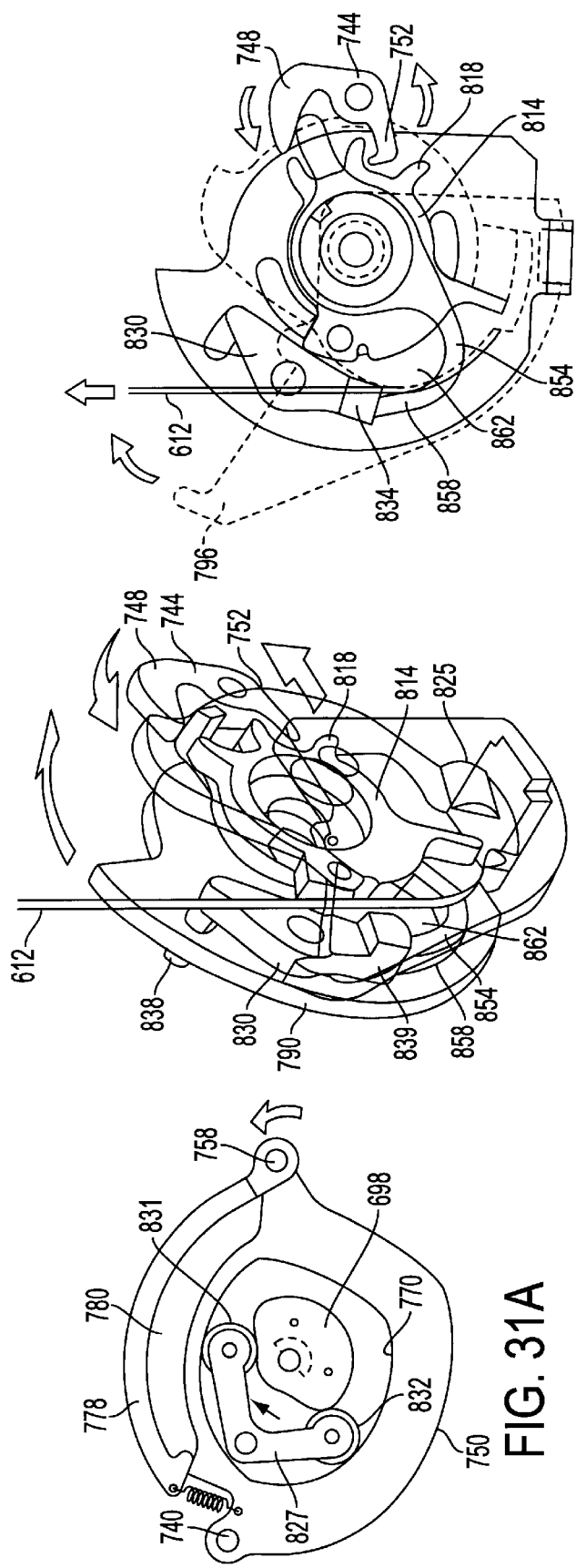

6,607,457 B2

ASSISTING APPARATUS FOR CHANGING SPEEDS IN A BICYCLE TRANSMISSION

CROSS REFERENCE TO RELATED APPLICATIONS

This application is a continuation-in-part of U.S. patent application Ser. No. 09/971,328 filed Oct. 3, 2001, now abandoned, entitled Assisting Apparatus for Changing Speeds in a Bicycle Transmission by Tatsuya Kawakami.

BACKGROUND OF THE INVENTION

The present invention is directed to bicycle transmissions and, more particularly, to an apparatus for assisting a change speed operation in the bicycle transmission.

Various devices have been developed to help reduce the effort needed to operate bicycle transmissions such as derailleurs and internal hub transmissions. Examples of such devices particularly suited to assist the operation of derailleur transmissions are shown in U.S. Pat. No. 5,358,451. The devices shown therein for assisting the operation of a rear derailleur employ multiple moving parts that are in constant motion, thus increasing the amount of moving mass as well as the possibility of premature wear on the components. Devices shown therein for assisting the operation of a front derailleur accommodate only two front sprockets. However, many bicycles have more than two front sprockets. Thus, there is a desire for an assist device that can be used with more than two sprockets. It would also be helpful if the number of continuously moving parts is minimized.

SUMMARY OF THE INVENTION

The present invention is directed to an apparatus for assisting a speed change operation in a bicycle transmission. Like prior art devices, the apparatus can accommodate two front sprockets, but the apparatus also can accommodate more than two front sprockets. While it is not critical to realize the full contribution to the art by the present invention, the disclosed embodiments also minimize the number of constantly moving parts, thus reducing inertial forces and wear on the components.

In one embodiment of the present invention, not to be limited thereto, an assisting apparatus for using power from a rotating member to assist the operation of a bicycle transmission comprises a mounting unit and an input transmission member coupled to the mounting unit, wherein the input transmission member moves to at least a first input position, a second input position and a third input position. An output transmission member is coupled to the mounting unit, wherein the output transmission member moves to at least a first output position, a second output position, and a third output position corresponding to the first input position, the second input position and the third input position of the input transmission member, respectively. A rotating member engaging member moves between a rotating member engaging position and a rotating member disengaging position, and a motion transmitting mechanism is provided for transmitting motion from the rotating member engaging member to the output transmission member. A switching mechanism is provided for moving the rotating member engaging member to the rotating member engaging position when the input transmission member is in one of the first input position, second input position or third input position and the output transmission member is not in the corresponding first output position, second output position, or third output position, and for moving the rotating member engaging member to the rotating member disengaging position when the input transmission member is in one of the first input position, second input position or third input position and the output transmission member is in the corresponding first output position, second output position, or third output position.

In another embodiment of the present invention, an assisting apparatus for using power from a rotating member to assist the operation of a bicycle transmission includes many of the elements noted above, but it may or may not accommodate more than two gears. In this embodiment, the input transmission member and the output transmission member are coupled to the mounting member for rotation around a rotational axis. The rotational axis may be common to the input transmission member and to the output transmission member (although such is not necessary), which makes it convenient to detect when the two members are not in the proper corresponding positions.

In another embodiment of the present invention, an assisting apparatus for using power from a rotating member to assist the operation of a bicycle transmission includes many of the elements noted above for the first embodiment, and, like the embodiment noted above, it may or may not accommodate more than two gears. In this embodiment, the switching mechanism includes an axially sliding member that moves in the direction of the rotational axis when the input transmission member moves to one of the first input position or second input position and the output transmission member does not move to the corresponding first output position or second output position. Among other things, this feature allows the switching function to be laterally distributed.

In another embodiment of the present invention, an assisting apparatus for using power from a rotating member to assist the operation of a bicycle transmission includes many of the elements noted above, and it may or may not accommodate more than two gears. In this embodiment, the switching mechanism includes a cam that moves together with the input transmission member and a cam follower that moves with the output transmission member. Among other things, this feature allows direct control of the switching function by the input transmission member and uses fewer components.

BRIEF DESCRIPTION OF THE DRAWINGS

FIGS. 6A and 6B are front views showing the operation of position sensing members when the input transmission member rotates clockwise;

FIG. 8 is an exploded view showing the cooperation between the switching mechanism and the motion transmitting mechanism;

FIG. 9A is a side view of the assisting apparatus when the apparatus begins the assisting operation;

FIG. 9B is a view taken along 9B—9B 9in FIG. 9A;

FIG. 9C is a view taken along line 9C—9C in FIG. 9A;

FIG. 12A is a side view of the assisting apparatus showing the rotating member engaging pawl returning to the start position;

FIG. 12B is a view taken along 12B—12B in FIG. 12A;

FIG. 12C is a view taken along line 12C—12C in FIG. 12A;

FIG. 13A is a side view of the assisting apparatus at the completion of the shifting operation;

FIG. 13B is a view taken along 13B—13B in FIG. 13A;

FIG. 13C is a view taken along line 13C—13C in FIG. 13A;

FIG. 28 is an exploded view showing the operation of the input transmission member, position sensing member and rotating member engaging pawl at the beginning of a downshift operation;

FIG. 30A is a view showing the operation of the motion transmitting member and the output transmission member at the intermediate stage of the downshift operation when the motion transmitting member is at the end of the motion transmitting stroke;

FIG. 30B is a view showing the operation of the operation of the position maintaining mechanism at the intermediate stage of the downshift operation when the motion transmitting member is at the end of the motion transmitting stroke;

FIG. 31A is a view of the cam, cam follower and position sensing member at an intermediate stage of the downshift operation when the motion transmitting member begins to return to the home position;

FIG. 31B is a view showing the operation of the motion transmitting member and the output transmission member at the intermediate stage of the downshift operation when the motion transmitting member begins to return to the home position;

FIG. 31C is a view showing the operation of position maintaining mechanism at the intermediate stage of the downshift operation when the motion transmitting member begins to return to the home position;

DETAILED DESCRIPTION OF THE EMBODIMENTS

Figure 1:
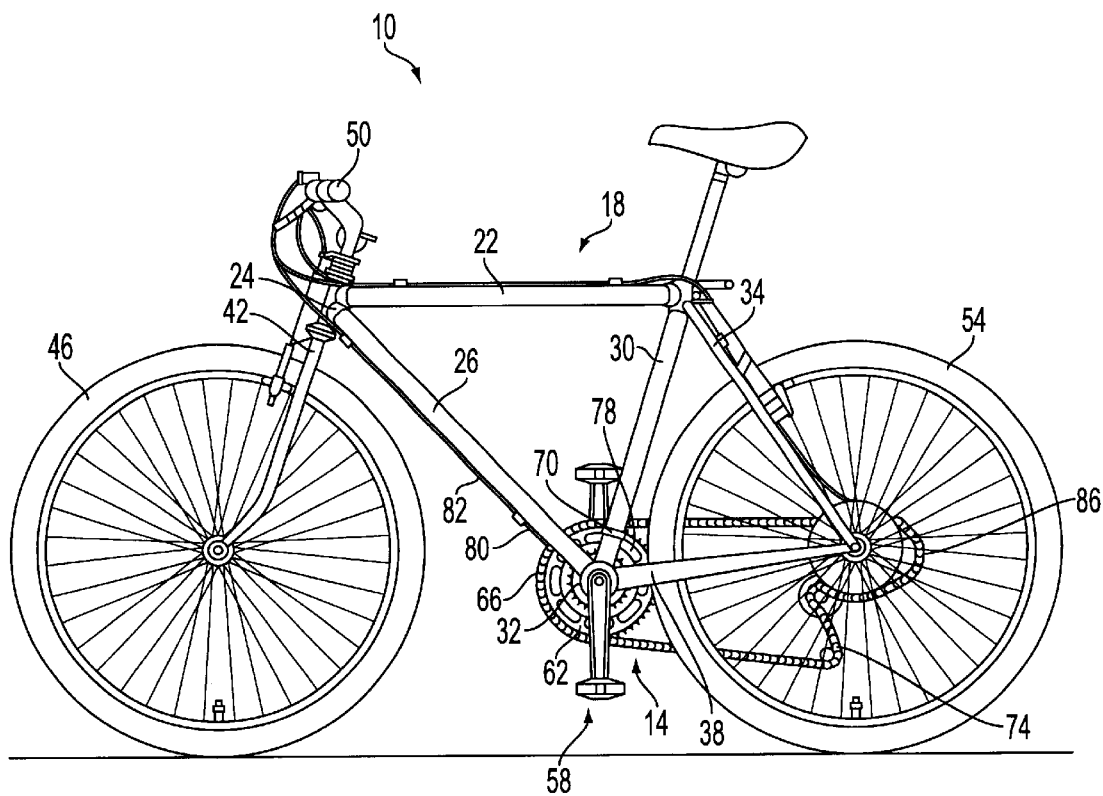
FIG. 1 is a side view of a particular embodiment of a bicycle that incorporates an apparatus according to the invention for assisting a speed change operation in a bicycle transmission.

FIG. 1 is a side view of a bicycle 10 that incorporates a particular embodiment of an assisting apparatus 14 according to the invention for assisting a change speed operation in a bicycle transmission. Bicycle 10 may be any type of bicycle, and in this embodiment bicycle 10 includes a typical frame 18 comprising a top tube 22, a head tube 24, a down tube 26 extending downwardly from head tube 24, a seat tube 30 extending downwardly from top tube 22, a bottom bracket 32 disposed at the junction of down tube 26 and seat tube 30, a pair of seatstays 34 extending rearwardly and downwardly from top tube 22, and a pair of chainstays 38 extending rearwardly from bottom bracket 32. A fork 42 is rotatably supported within head tube 24, and a wheel 46 is rotatably supported to the lower end of fork 42. The rotational direction of fork 42 and wheel 46 is controlled by handlebars 50 in a well known manner. A rear wheel 54 having a plurality of coaxially mounted freewheel sprockets (not shown) is rotatably supported at the junction of seatstays 34 and chainstays 38, and a pedal assembly 58 supporting a plurality of front (chainwheel) sprockets 62 is rotatably supported within bottom bracket 32. In this embodiment, three front sprockets 62 rotate coaxially and integrally with pedal assembly 58. A chain 66 engages one of the plurality of front sprockets 62 and one of the plurality of freewheel sprockets mounted to rear wheel 54. A front derailleur 70 moves chain 66 from one front sprocket 62 to another, and a rear derailleur 74 moves chain 66 from one freewheel sprocket to another. Both operations are well known. In this embodiment, front derailleur 70 is controlled by pulling and releasing an output control wire 78 coupled to assisting apparatus 14, and assisting apparatus 14 is controlled by an input control wire 80 of a Bowden-type control cable 82. Rear derailleur 74 is controlled by a Bowden-type control cable 86 in a conventional manner.

Figure 2:
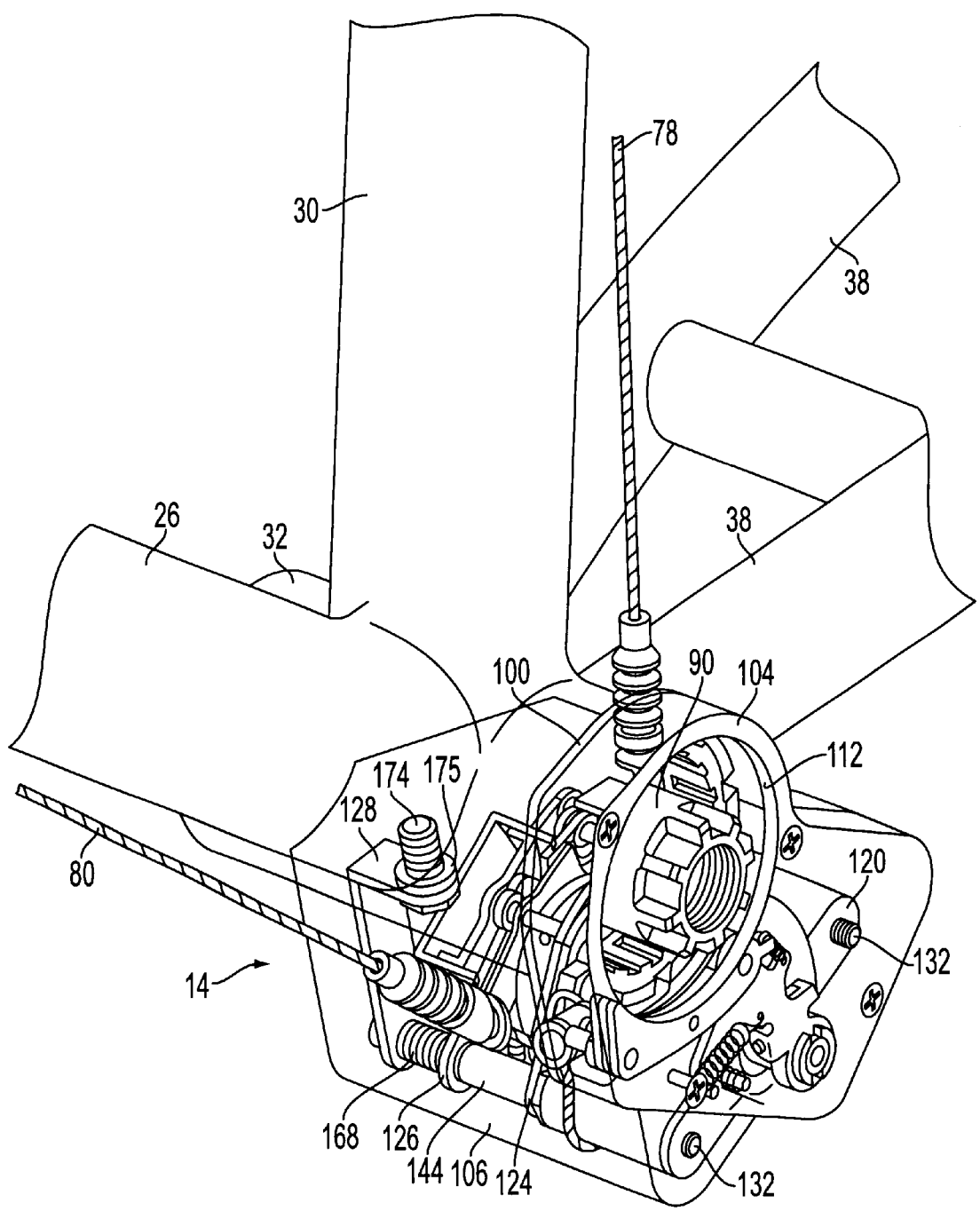
FIG. 2 is a close-up partially transparent view of a particular embodiment of an assisting apparatus according to the invention for changing speeds in a bicycle transmission.
Figure 3:
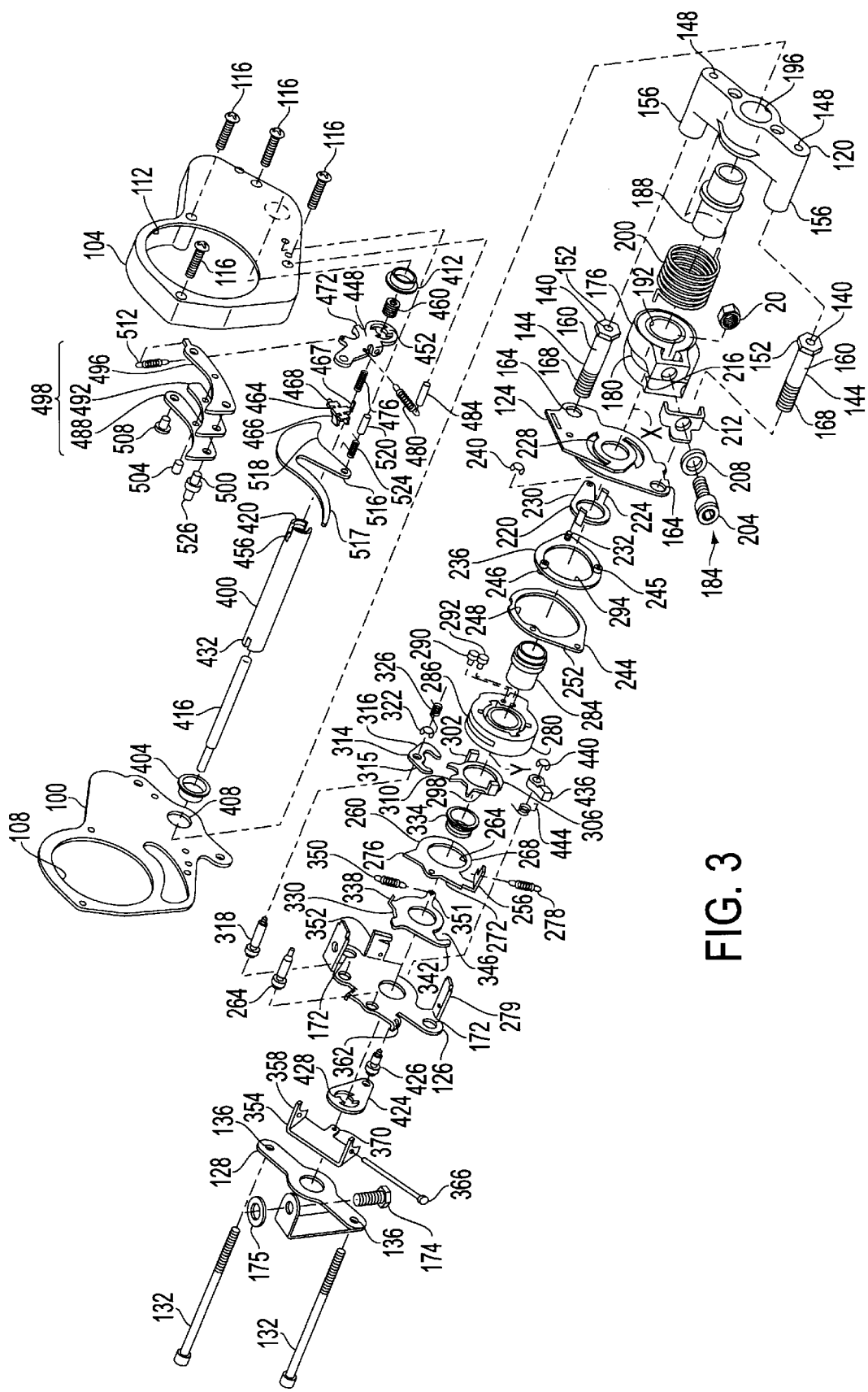
FIG. 3 is an exploded view of the assisting apparatus shown in FIG. 2.

FIG. 2 is a close-up partially transparent view of assisting apparatus 14, and FIG. 3 is an exploded view of the assisting apparatus shown in FIG. 2. In this embodiment, assisting apparatus 14 uses the rotational power of a crank axle 90 that is rotatably supported within bottom bracket 32 and rotated by pedal assembly 58 to assist the operation of front derailleur 70. Assisting apparatus 14 comprises upper housing members 100 and 104 and a lower housing member 106 (not shown in FIG. 3). Upper housing members 100 and 104 include openings 108 and 112, respectively, that align with the opening in bottom bracket 32, and they are fastened together with screws 116. Disposed within the space primarily formed by housing member 106 are mounting members 120, 124, 126 and 128 which are connected together by screws 132 that extend through openings 136 in mounting member 128, through openings 140 in hollow bolts 144 and into threaded openings 148 in mounting member 120. In the assembled unit, heads 152 of hollow bolts 144 are sandwiched between mounting member 124 and cylindrical portions 156 of mounting member 120, shanks 160 of hollow bolts 144 extend through openings 164 of mounting member 124, threaded portions 168 of hollow bolts 144 screw into threaded openings 172 in mounting member 126, and the ends of hollow bolts 144 abut against the side of mounting member 128. Mounting member 128 is attached to the bicycle using a bolt 174 and a washer 175.

An input transmission member 176 is supported by a tubular bearing 188 that extends into an opening 192 in input transmission member 176 and into an opening 196 in mounting member 120. Thus, input transmission member 176 is rotatably coupled relative to mounting members 120, 124, 126 and 128 so that input transmission member 176 rotates around a rotational axis X. Input transmission member 176 is biased counterclockwise relative to mounting members 120, 124, 126 and 128 by a spring 200 fixed in a known manner between input transmission member 176 and mounting member 120. Input transmission member 176 includes an input control wire winding surface 180 and a wire coupler 184 comprising a screw 204, a washer 208 and a wire receiving member 212. Screw 204 screws into a threaded opening 216 in input transmission member 176 so that input control wire 80 is firmly sandwiched between input transmission member 176 and wire receiving member 212. Input control wire 80 then wraps around wire winding surface 180 so that pulling input control wire 80 causes input transmission member 176 to rotate clockwise against the biasing force of spring 200, and releasing input control wire 80 causes input transmission member 176 to rotate counterclockwise in accordance with the biasing force of spring 200. Since, in this embodiment, there are three front sprockets 62, input transmission member 176 is designed to move to three distinct input positions.

An input drive member 220 has a pair of coupling tabs 224 that extend through slots 228 in mounting member 124 and onto retaining slots (not shown) in input transmission member 176 so that input drive member 220 rotates together with input transmission member 176. A drive arm 230 of input drive member 220 is coupled to a post 232 extending from an intermediate ring 236 and held in place with a C-clip 240. Position sensing member engaging members 245 and 246 in the form of rollers rotatably attached to intermediate ring 236 engage an inner peripheral surface 248 of a position sensing member 244 that defines a position sensing arc. A coupling ear 252 of position sensing member 244 is coupled to a coupling tab 256 of another position sensing member 260. Position sensing member 260 includes an oval-shaped inner peripheral surface 264, an outer peripheral surface 268 defining a pawl directing surface (member), and control surfaces 272 and 276. Both position sensing member 244 and position sensing member 260 are pivotably coupled to a pivot shaft 264 that extends from mounting member 126, and they are biased in a counterclockwise direction by a spring 278 connected between coupling tab 256 and a ledge 279 extending from mounting member 126. Position sensing members 244 and 260 in this embodiment can be deemed a position sensing unit An output transmission member 280 in the form of a wire winding member is supported on a tubular bearing 284 that abuts against mounting member 124 in the assembled state so that output transmission member 280 rotates around a rotational axis Y. In this embodiment, rotational axis Y is coincident with rotational axis X. Output transmission member 280 has a wire winding groove 286 and a cable end stop 288 (FIG. 7) for receiving a cable end bead therein (not shown) to function as a wire coupler. Since there are three front sprockets 62 in this embodiment, output transmission member 280 is designed to move to three distinct output positions. Abutment members 290 and 292 are attached to one side of output transmission member 280 for engaging an inner peripheral surface 294 of intermediate ring 236 in a manner discussed below. A ratchet 298 has a pair of coupling tabs 302 that extend into retaining slots (not shown) in output transmission member 280 so that ratchet 298 rotates together with output transmission member 280. Ratchet 298 includes a plurality of drive teeth 306 (e.g., three) and a plurality of position maintaining teeth 310 (e.g., three) defining respective drive surfaces and position maintaining surfaces.

A position maintaining pawl 314 having pawl teeth 315 and 316 is rotatably supported on a pivot shaft 318 that extends from mounting member 126. Position maintaining pawl 314 is held in place on pivot shaft 318 by a C-clip 322, and it is biased in a clockwise direction by a spring 326 in a known manner. A position release plate 330 is rotatably supported on a tubular bearing 334 that abuts against mounting member 126 in the assembled state. Position release plate 330 includes a pawl release member in the form of a pawl release projection 338, a motion transmitting pawl engaging projection 342 and a motion transmitting pawl receiving recess 346. Position release plate 330 is biased in a counterclockwise direction by a spring 350 connected between a bias arm 351 extending from position release plate 330 and a bias arm 352 extending from mounting member 126. A motion converting member in the form of a motion converting plate 354 having mounting ears 358 is pivotably connected to corresponding mounting ears 362 on mounting member 126 through a pivot shaft 366. Motion converting plate 354 includes a drive tab 370 which functions in a manner described below.

Figure 4:
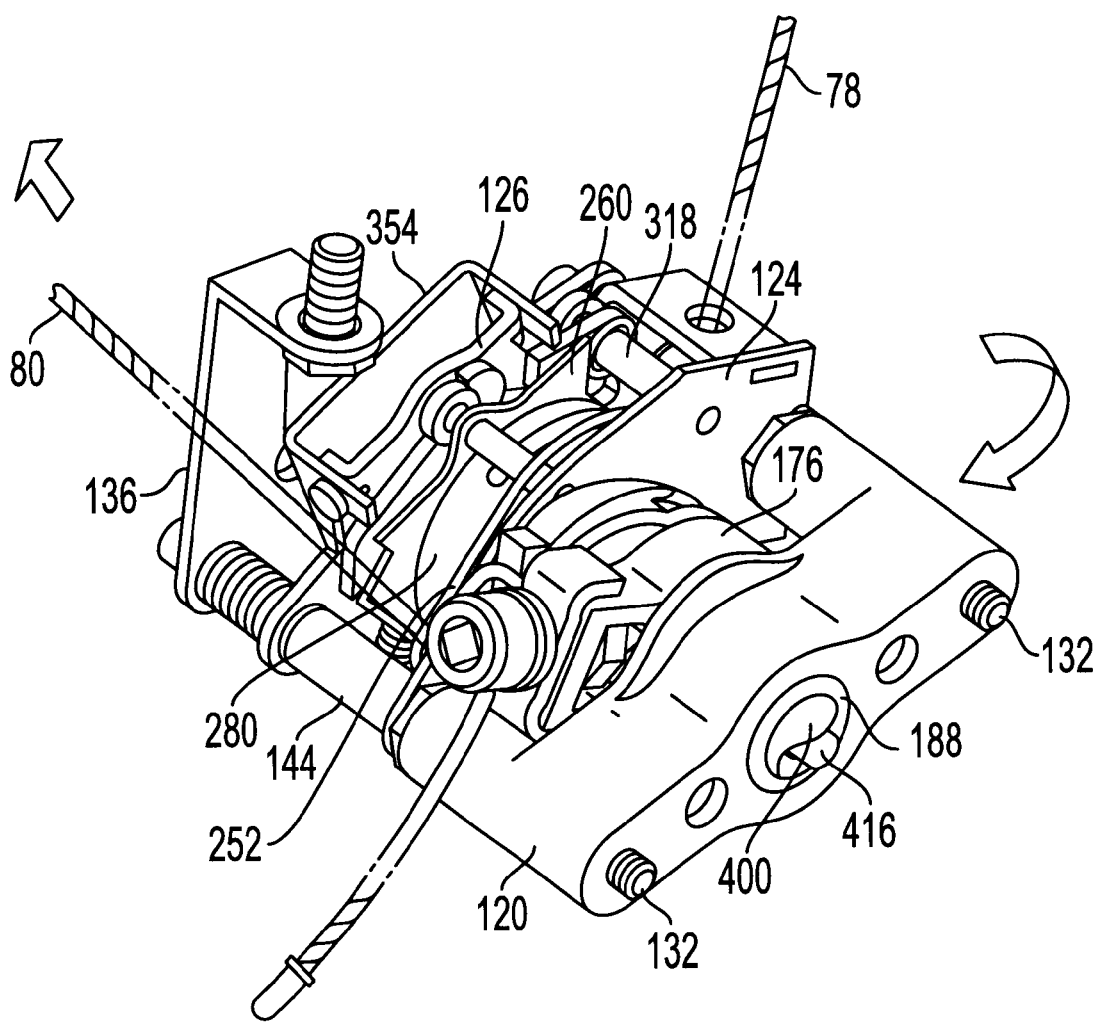
FIG. 4 is an assembled view of a portion of the switching mechanism shown in FIG. 2.

A drive shaft 400 extends through a tubular bearing 404 mounted in an opening 408 formed in mounting member 100, extends through bearings 334, 284 and 188, exits mounting member 120 as shown in FIG. 4, and terminates in a bearing 412 disposed at a side surface of mounting member 104. A push rod 416 extends through a central bore 420 in drive shaft 400. A pawl coupler 424 having a pivot shaft 426 extending therefrom is nonrotatably coupled to drive shaft 400 by coupling tabs 428 that mesh with corresponding coupling grooves 432 disposed at one end of drive shaft 400. A motion transmitting pawl 436 is pivotably supported on pivot shaft 426 with a C-clip 440, and it is biased in a clockwise direction by a spring 444. Another pawl coupler 448 is nonrotatably coupled to drive shaft 400 by coupling tabs 452 that mesh with corresponding coupling grooves 456 disposed at the other end of drive shaft 400. The radially inner edges of coupling tabs 452 form a threaded surface for threadingly receiving a set screw 460 therein. A release control member 464 having a release control tab 466 and a bias tab 467 is pivotably mounted to pawl coupler 448 by mounting ears 468 that engage corresponding mounting ears 472 on pawl coupler 448. Release control member 464 can be considered a pawl retaining member in this embodiment, and it is biased clockwise by a spring 476 mounted between bias tab 467 and set screw 460. Pawl coupler 448, and hence drive shaft 400, is biased counterclockwise by a spring 480 mounted between pawl coupler 448 and a spring support 484 extending from mounting member 104. Pawl plates 488, 492 and 496 are fastened together with fasteners 500 and 504, and pawl plates 488 and 496 are pivotably coupled to pawl coupler 448 through a pivot shaft 508. Pawl plates 488, 492 and 496 form an overall pawl 498 that receives a biasing force in a counterclockwise direction by a spring 512 (which can be considered a pawl moving member in this embodiment) coupled between pawl plate 496 and pawl coupler 448. A pawl control member 516 having an arcuate pawl control surface 517 (which can be considered another pawl retaining member in this embodiment) and an arcuate release control surface 518 is pivotably coupled to mounting member 104 through a pivot shaft 520, and it receives a biasing force directed in a counterclockwise direction viewed in FIG. 3 by a spring 524 mounted around pivot shaft 520 between release control surface 518 and mounting member 104. Pawl control surface 517 engages a complementary pawl control surface 526 extending from fastener 500.

In this embodiment, pawl 498, pawl coupler 448, drive shaft 400, pawl coupler 424, pawl 436 and ratchet 298 constitute a motion transmitting mechanism for communicating rotational motion of axle 90 to output transmission member 280. Furthermore, in this embodiment, pawl control member 516, release control member 464, push rod 416, motion converting member 354, position sensing members 244 and 260, intermediate ring 236 and input drive member 220 constitute a switching mechanism for moving pawl 498 to a rotating member engaging position when the input transmission member 176 is in one of the first input position, second input position or third input position and the output transmission member 280 is not in the corresponding first output position, second output position, or third output position, and for moving the pawl 498 to the rotating member disengaging position when the input transmission member 176 is in one of the first input position, second input position or third input position and the output transmission member 280 is in the corresponding first output position, second output position, or third output position.

Figure 5:
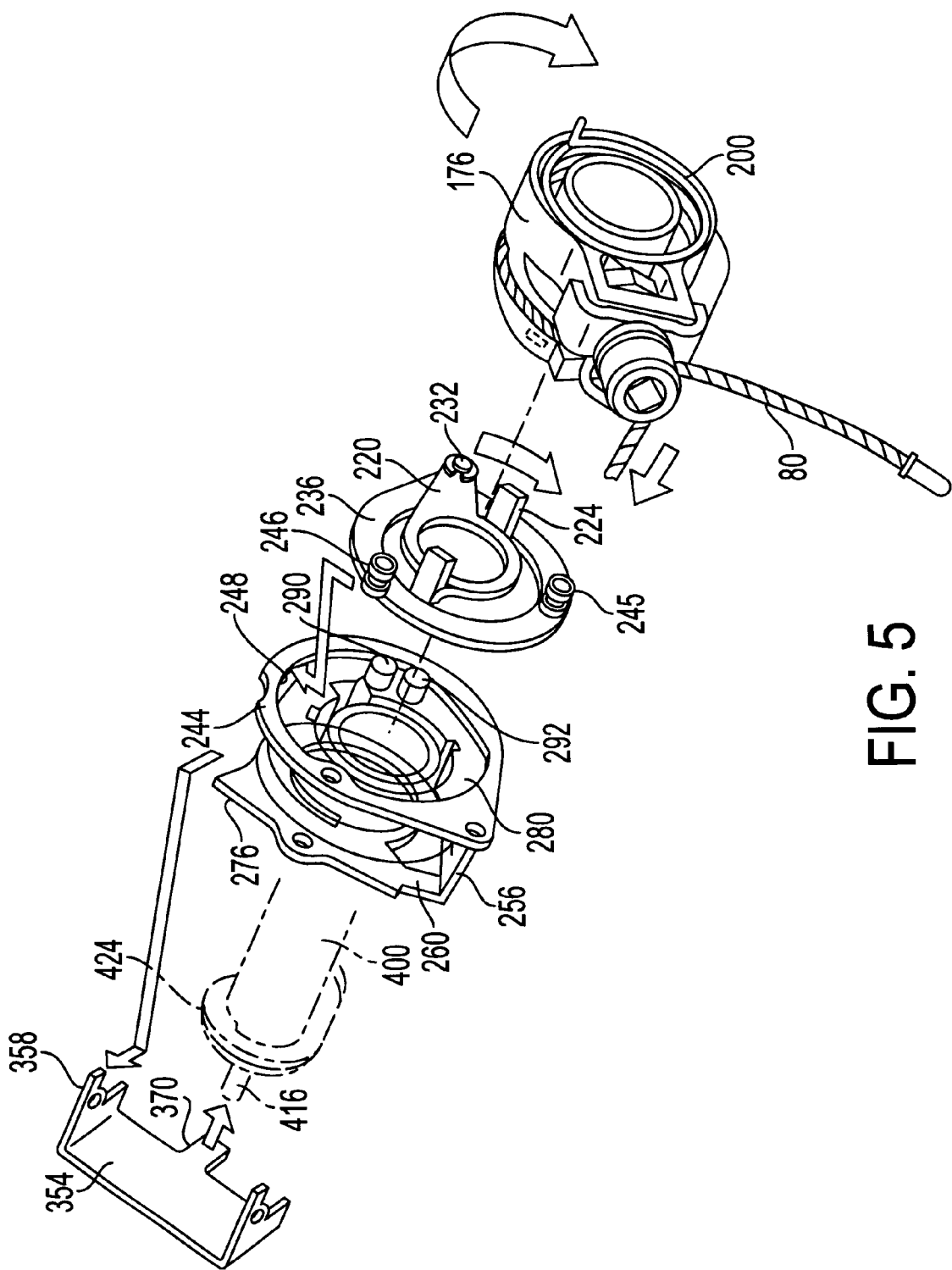
FIG. 5 is an exploded view of a portion of the switching mechanism shown in FIG. 4.

The operation of assisting apparatus 14 when input control wire 80 is pulled is illustrated in FIGS. 5–13C. As shown in FIGS. 5, 6A and 6B, pulling input control wire 80 causes input transmission member 176 to rotate clockwise against the biasing force of spring 200 to an upshifting position relative to output transmission member 280 (in this embodiment). This, in turn, causes input drive member 220 to rotate clockwise, since input transmission member 176 and input drive member 220 rotate together as a unit. Drive arm 230 of input drive member 220 rotates intermediate ring 236 clockwise, but when inner peripheral surface 294 of intermediate ring 236 contacts abutment member 290 on output transmission member 280 as shown in FIG. 6B, abutment member 290 acts as a fulcrum and causes intermediate ring 236 to rotate eccentrically with respect to the coincident rotational axes X and Y. As a result, intermediate ring 236 has a component of motion directed to the right, roller 246 exerts a force directed to the right against position sensing member 244, and position sensing members 244 and 260 rotate counterclockwise around pivot shaft 264. This counterclockwise rotation of position sensing members 244 and 260 causes control surface 276 on position sensing member 260 to move radially relative to input transmission member 176 and output transmission member 280 to push upwardly on mounting ear 358 (which can be considered a switch-on position), thus causing motion converting plate 354 to rotate counterclockwise so that drive tab 370 presses against push rod 416.

Figure 7:
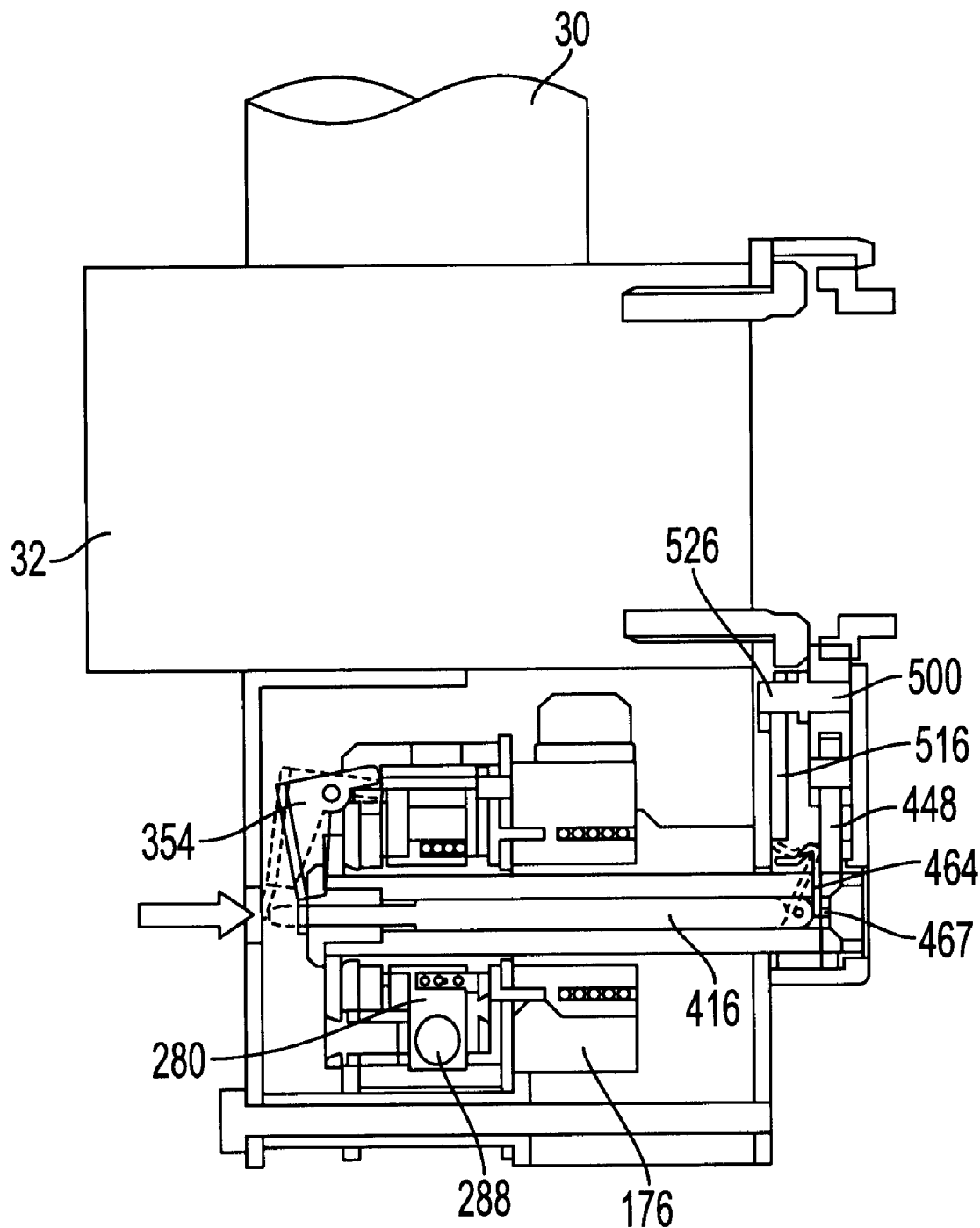
FIG. 7 is a side view showing the operation of the of the switching mechanism.

As shown in FIGS. 7 and 8, drive tab 370 moves push rod 416 to the right, and push rod 416 presses against bias tab 467 to cause release control member 464 to rotate counterclockwise. This causes release control tab 466 to rotate downwardly which, in turn, allows pawl control member 516 to rotate clockwise because the weight of pawl control member 516 overcomes the biasing force of spring 524. Clockwise rotation of pawl control member 516 causes pawl control surface 517 to move upwardly, thus allowing pawl 498 to rotate clockwise into a rotating member engaging position as a result of the biasing force of spring 512. In this position, pawl 498 can engage either of two abutments 530 formed on a rotating member 534 that is mounted for integral rotation (counterclockwise) with axle 90. Thus, pawl 498 functions as a rotating member engaging member.

FIGS. 9A–9C are views of assisting apparatus 14 when apparatus 14 begins the assisting operation. These views correspond to a situation where the chain 66 engages the smallest front sprocket 62 and is to be switched to the next larger sprocket. As shown in FIG. 9B, pawl 498 is in the rotating member engaging position and is contacting one of the abutments 530 on rotating member 530. When position sensing member 260 is in the counterclockwise rotated position shown in FIG. 9C, the oval-shaped inner peripheral surface 264 allows pawl directing surface 268 to move to the right to expose drive teeth 306 on ratchet 298 and to guide motion transmitting pawl 436 into engagement with the nearest drive tooth 306. At this time, pawl tooth 316 of position maintaining pawl 314 is located to the right of the rightmost position maintaining tooth 310.

Figure 10A:
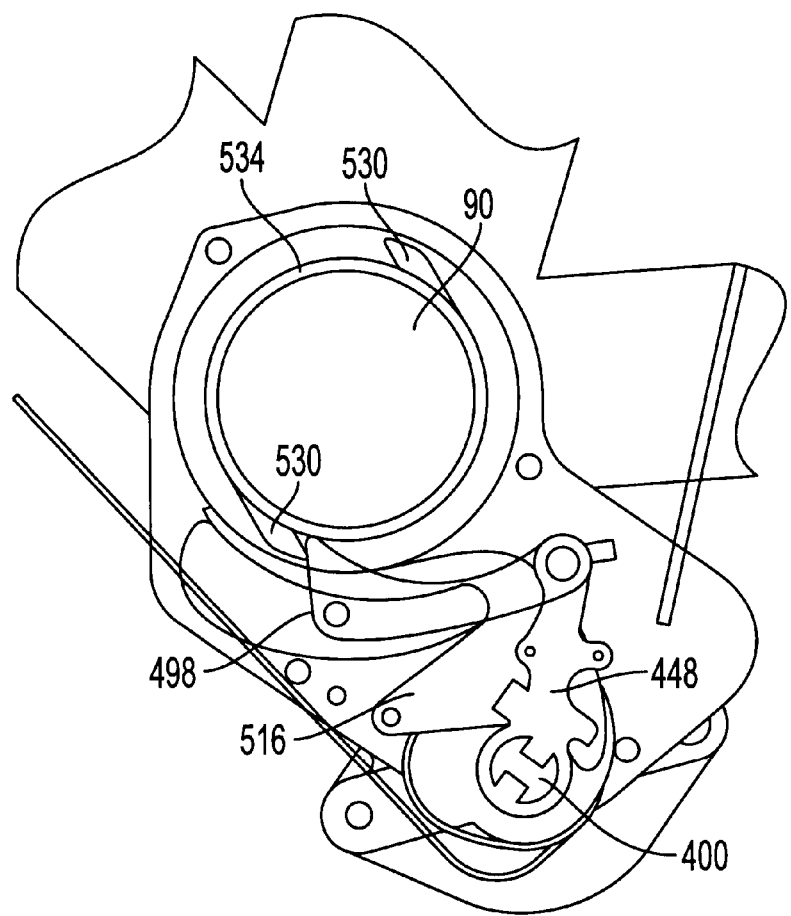
FIGS. 10A and 10B illustrate the operation of the motion transmitting mechanism when the rotating member engaging pawl begins rotating with the rotating member.
Figure 10B:
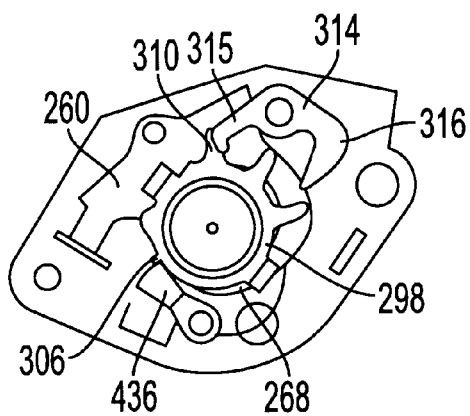

FIGS. 10A and 10B illustrate the operation of the motion transmitting mechanism when the rotating member engaging pawl 498 begins moving with the rotating member 534. As shown in those figures, the counterclockwise rotation of rotating member 534 causes pawl coupler 448 and drive shaft 400 to rotate clockwise. This, in turn, causes pawl coupler 424 and motion transmitting pawl 436 to engage the nearest drive tooth 306 and rotate ratchet 298 clockwise with output transmission member 280. Output transmission member 280 then pulls on output control wire 78 to activate front derailleur 70. At the same time, pawl tooth 316 rides up and over the rightmost position maintaining tooth 310.

Figure 11A:
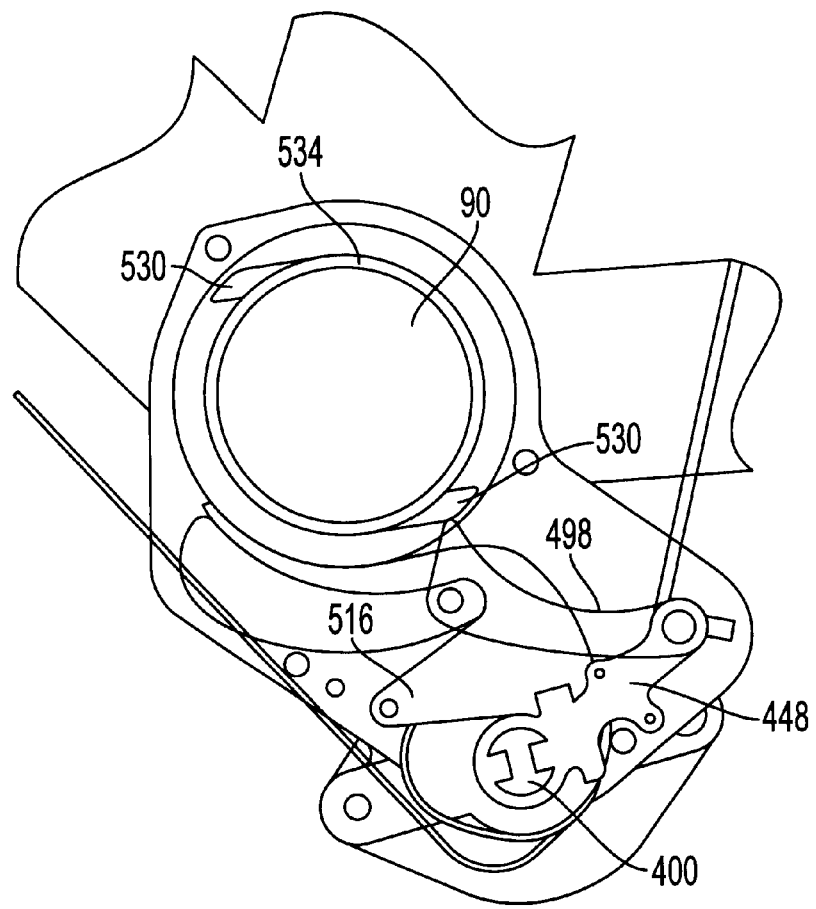
FIGS. 11A and 11B illustrate the operation of the motion transmitting mechanism when the rotating member engaging pawl disengages from the rotating member.
Figure 11B:
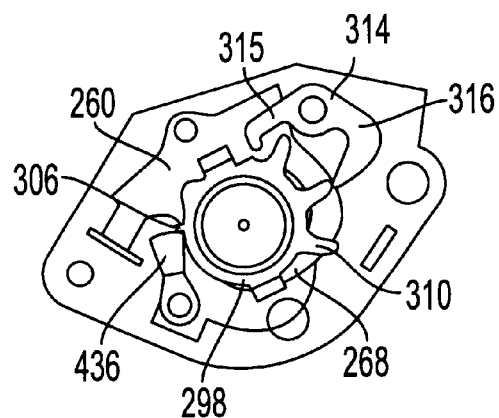

FIGS. 11A and 11B illustrate the operation of the motion transmitting mechanism when the rotating member engaging pawl 498 disengages from the rotating member 534. In this state, pawl 498 already has disengaged from abutment 530 of rotating member 534, and ratchet 298 has rotated such that pawl tooth 316 has ridden up but not over the middle position maintaining tooth 310. At this time, drive shaft 400 and pawl coupler 448 will begin rotating counterclockwise as a result of the biasing force exerted on pawl coupler 448 by spring 480.

FIGS. 12A–12C are views of assisting apparatus 14 as the rotating member engaging pawl 498 moves back toward the start position, and FIGS. 13A–13C are views of assisting apparatus 14 at the completion of the shifting operation. As shown in FIGS. 12A–12C, drive shaft 400 and pawl coupler 448 rotate counterclockwise, motion transmitting pawl 436 disengages from drive tooth 306, and ratchet 298 and output transmission member 280 rotate counterclockwise as a result of the biasing force exerted on output control wire 78 by the return spring associated with front derailleur 70. Because output transmission member 280 has a net clockwise rotation from the position shown in FIGS. 9A–9C, abutment member 290 no longer acts as a fulcrum against the inner peripheral surface 294 of intermediate ring 236, and roller 245 on intermediate ring 236 presses against the inner peripheral surface 248 of position sensing member 244 to rotate position sensing member 244 clockwise. At that time, control surface 276 of position sensing member 260 no longer presses up against mounting ear 358 on motion converting plate 354 (which can be considered a switch-off position), motion converting plate 354 rotates clockwise, push rod 416 moves to the left and release control member 464 rotates clockwise as shown in FIG. 12A as a result of the biasing force of spring 476, pawl control member 516 rotates counterclockwise, and pawl control surface 517 presses down on pawl control surface 526 of fastener 500 to rotate pawl 498 counterclockwise to the rotating member disengaged position shown in FIG. 13B. Also, ratchet 298 rotates counterclockwise until pawl tooth 316 of position maintaining pawl 314, under the biasing force of spring 326, abuts against the left side of the rightmost position maintaining tooth 310 as shown in FIG. 13C, thus maintaining the position of output transmission member 280.

Figure 14:
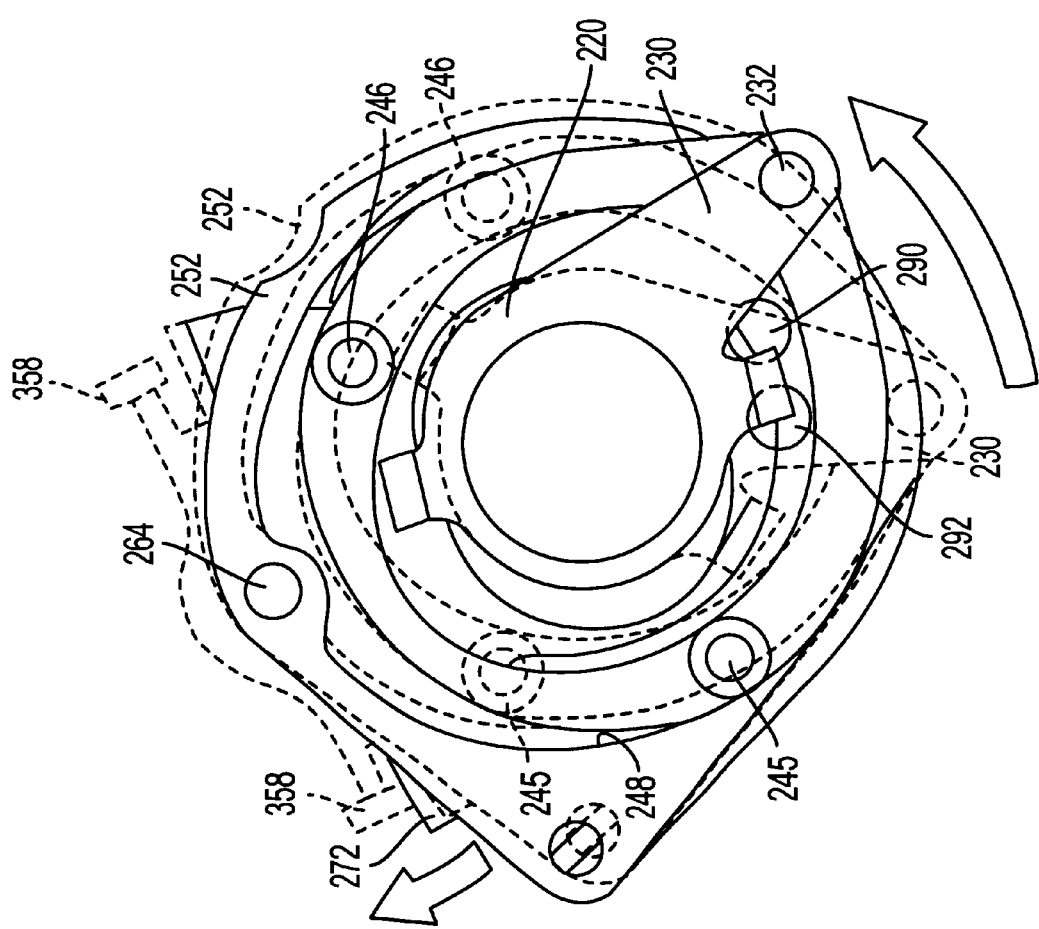
FIG. 14 is a front view showing the operation of position sensing members when the input transmission member rotates counterclockwise.

It should be noted that, in this embodiment, ratchet 298 and output transmission member 280 initially rotate beyond the desired position and then return to the desired position. This produces an effect called "overshift," wherein the front derailleur 70 moves chain 66 beyond the destination sprocket and then returns to the desired position, usually centered over the destination sprocket. This effect, normally achieved by manual operation of the derailleur, is well known and sometimes desirable when attempting to move a chain from a smaller sprocket to a larger sprocket. Of course, depending on the application, the mechanism can be designed to avoid such a phenomenon The operation of assisting apparatus 14 when input control wire 80 is released is illustrated in FIGS. 14–19C. Releasing input control wire 80 causes input transmission member 176 and input drive member 220 to rotate counterclockwise in accordance with the biasing force of spring 200 to a downshifting position relative to output transmission member 280 (in this embodiment). Drive arm 230 of input drive member 220 rotates intermediate ring 236 counterclockwise, but when inner peripheral surface 294 of intermediate ring 236 contacts abutment member 292 on output transmission member 280 as shown in FIG. 14, abutment member 292 acts as a fulcrum and causes intermediate ring 236 to rotate eccentrically with respect to the coincident rotational axes X and Y. As a result, roller 245 exerts a force directed to the left against position sensing member 244, thus causing position sensing members 244 and 260 to rotate clockwise around pivot shaft 264. This clockwise rotation of position sensing members 244 and 260 cause control surface 272 on position sensing member 260 to push upwardly on the left side mounting ear 358, thus causing motion converting plate 354 to rotate counterclockwise so that drive tab 370 presses against push rod 416.

Figure 15A:
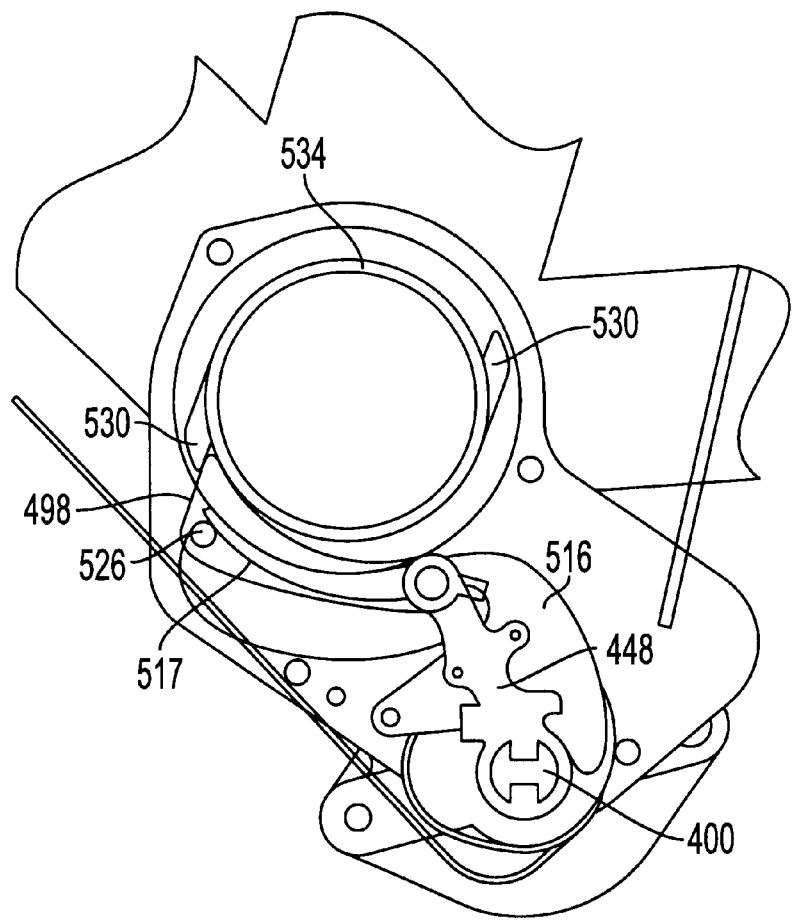
FIGS. 15A and 15B illustrate the operation of the motion transmitting mechanism when the apparatus begins the assisting operation.
Figure 15B:
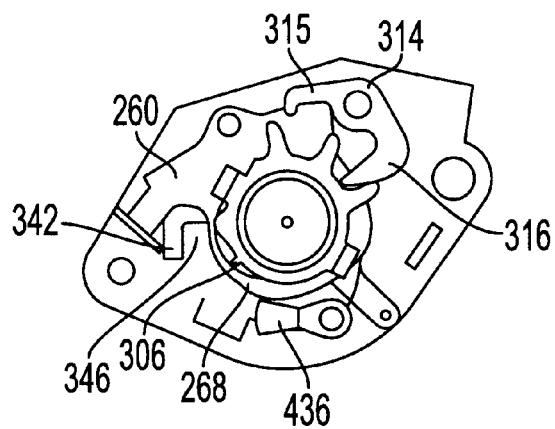
Figure 16A:
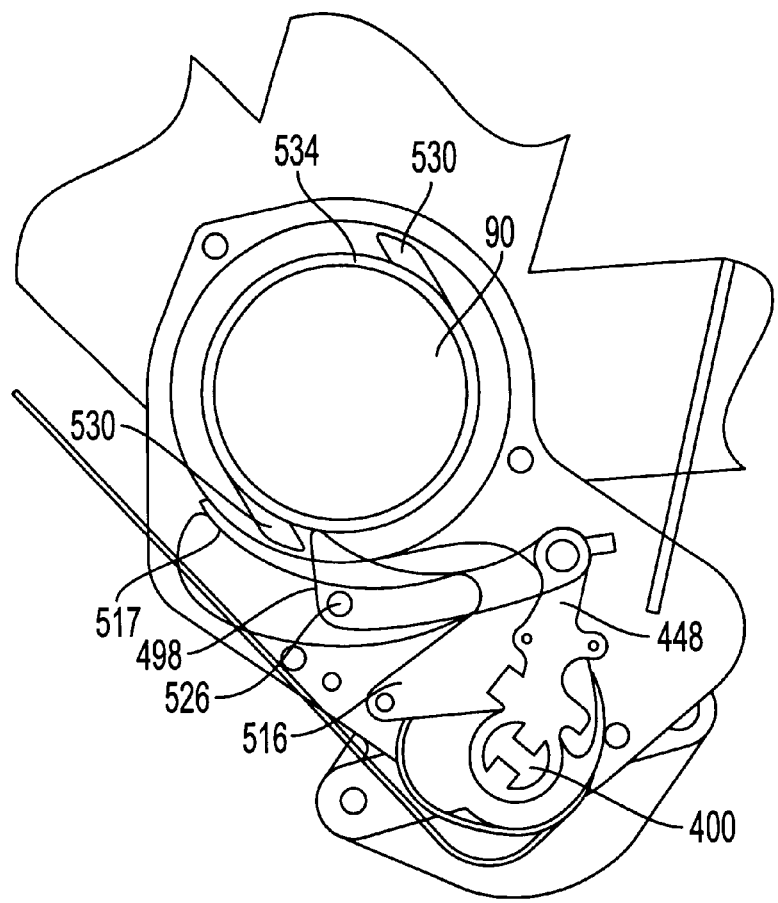
FIGS. 16A and 16B illustrate the operation of the motion transmitting mechanism when the rotating member engaging pawl begins rotating with the rotating member.
Figure 16B:
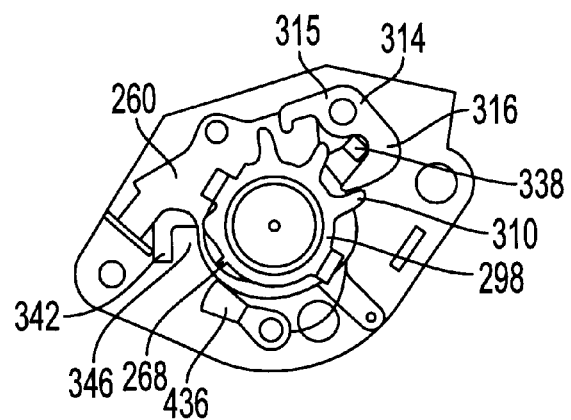
Figure 17A:
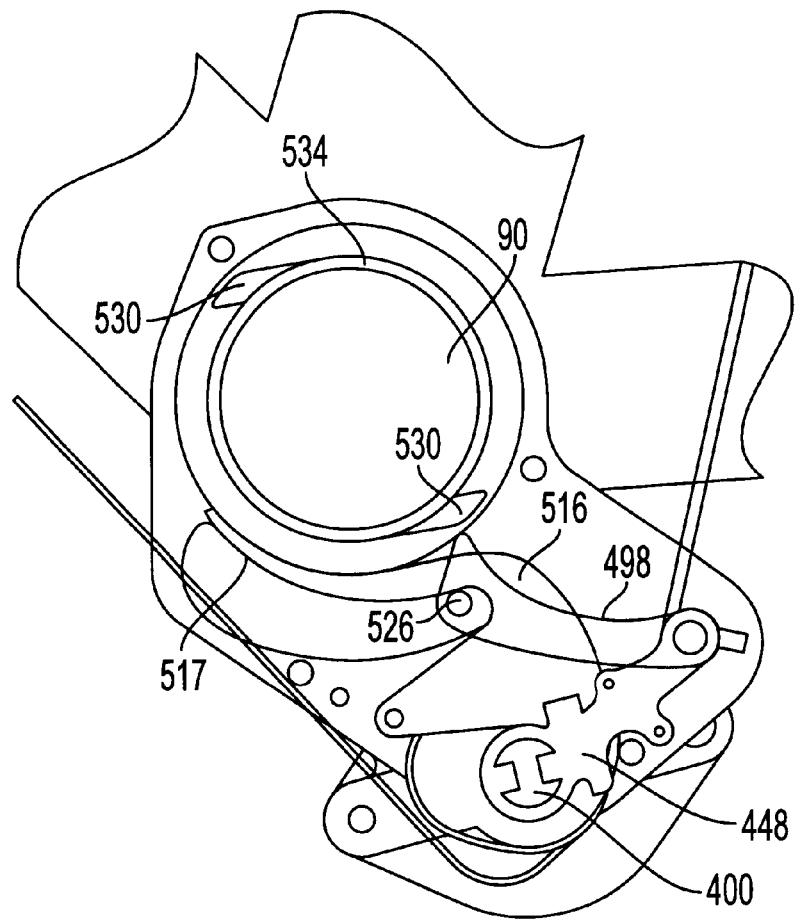
FIGS. 17A and 17B illustrate the operation of the motion transmitting mechanism when the rotating member engaging pawl disengages from the rotating member.
Figure 17B:
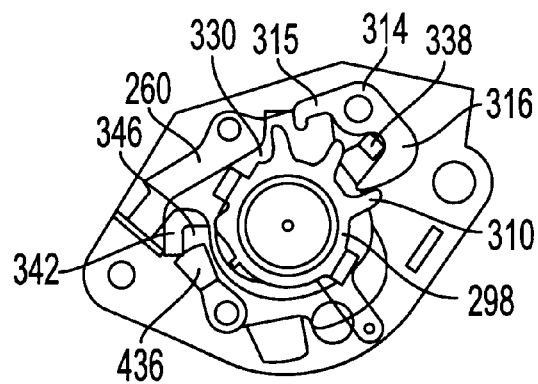
Figure 18A:
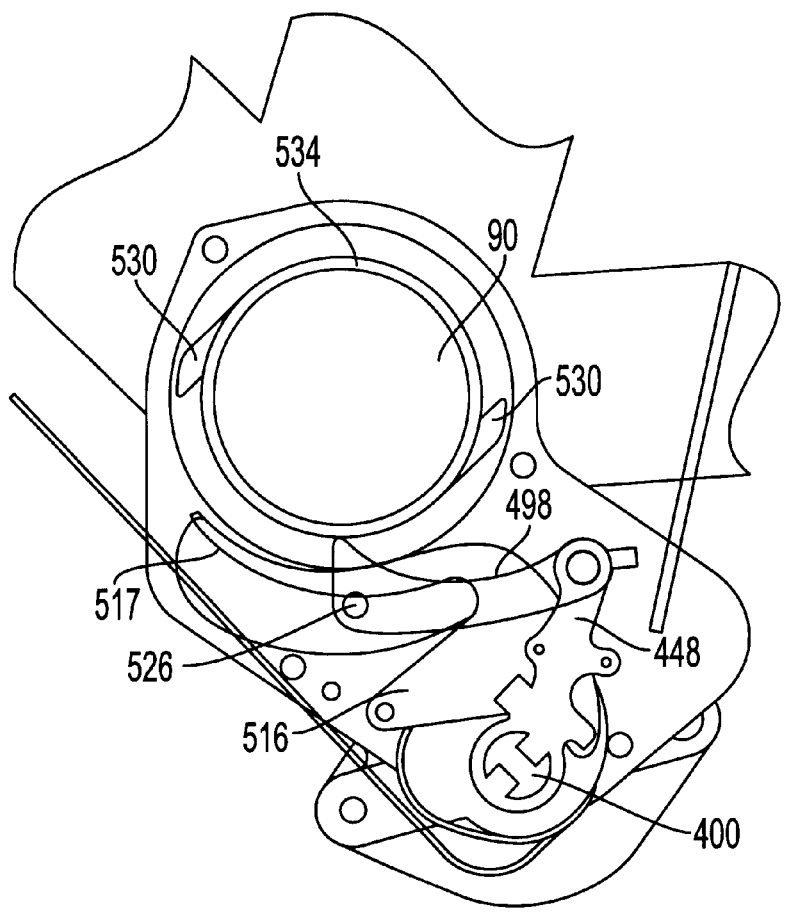
FIGS. 18A and 18B illustrate the operation of the motion transmitting mechanism as the rotating member engaging pawl returns to the start position.
Figure 18B:
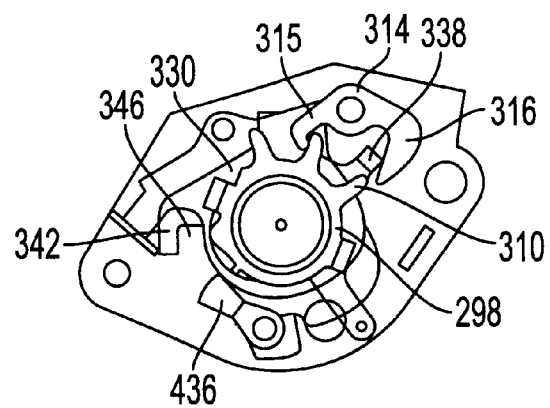
Figure 19A:
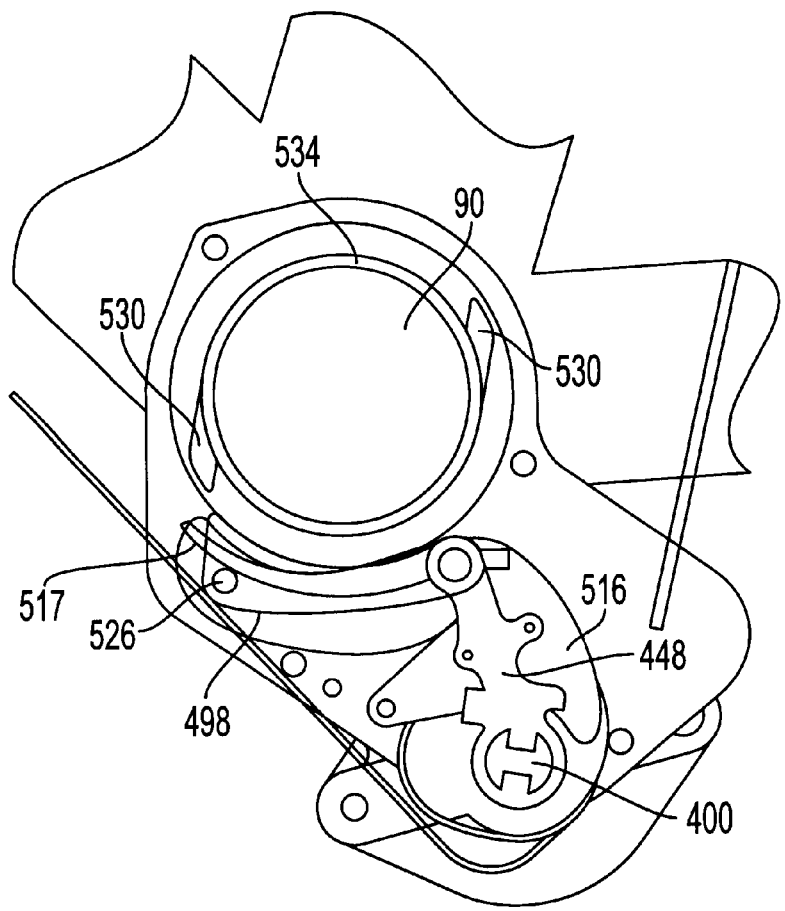
FIGS. 19A and 19B illustrate the operation of the motion transmitting mechanism at the completion of the shifting operation.
Figure 19B:
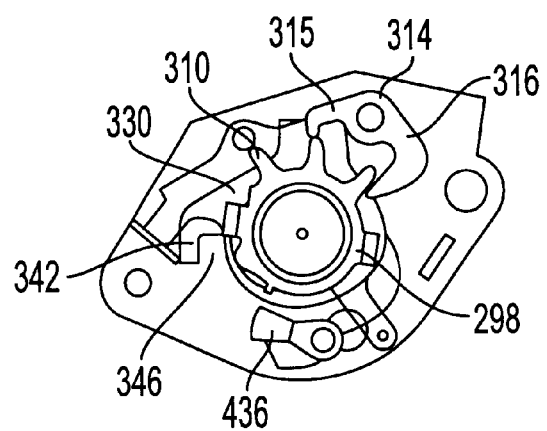

The operation of assist mechanism 14 at this time is similar to the operation when input control wire 80 is pulled, so only the differences will be described. The main difference lies in the operation of motion transmitting pawl 436. Since position sensing members 244 and 260 rotated clockwise, the pawl directing surface 268 of position sensing member 260 moves to the left as shown in FIG. 15B to prevent motion transmitting pawl 435 from engaging the drive surfaces 306 of ratchet 298. As a result, as shown in FIG. 16B, motion transmitting pawl 436 moves along pawl directing surface 268, bypassing drive surfaces 306, until motion transmitting pawl 436 engages pawl engaging projection 342 on position release plate 330 as shown in FIG. 17B. Motion transmitting pawl 436 then rotates position release plate 330 to cause pawl release projection 338 to press against the left side of pawl tooth 316, thus causing position maintaining pawl 314 to rotate counterclockwise around pivot shaft 318. As soon as pawl tooth 316 clears the tip of the rightmost position maintaining tooth 310, ratchet 298 rotates counterclockwise until the middle position maintaining tooth 310 is caught by pawl tooth 315 as shown in FIG. 18B. As motion transmitting pawl 436 moves away from pawl release projection 338 back to the start position, position release plate 330 rotates counterclockwise in accordance with the biasing force of spring 350, thus rotating pawl engaging projection 342 away from pawl tooth 316. This, in turn, allows position maintaining pawl 314 to rotate clockwise to the final position shown in FIG. 19B.

One advantage of an assisting apparatus according to the present invention is that the assisting apparatus can be designed for any number of front sprockets. Furthermore, a rider can shift more than one gear at a time because of the design of intermediate ring 236, rollers 245 and 246, abutment members 290 and 292, and position sensing members 244 and 260. More specifically, when the rider pulls input control wire 80 to rotate input transmission member 176 to shift more than two gears, such as from the smallest to the largest front sprocket 62 (from the first input position to the third input position), intermediate ring 236 rotates further to a position such that the fulcrum effect of abutment member 290 or 292 remains after output transmission member 280 rotates to the second output position. Thus, although pawl 498 disengages from the corresponding abutment 530 after abutment 530 rotates past it, pawl 498 remains in the rotating member engaging position until it once again engages one of the abutments 530 to cause the rotation of output transmission member 280 to the third output position. Once the output transmission member 280 reaches the third output position corresponding to the third input position, the fulcrum effect of abutment member 290 or 292 ceases, and the system reverts to the idle state as described above.

Figure 20:
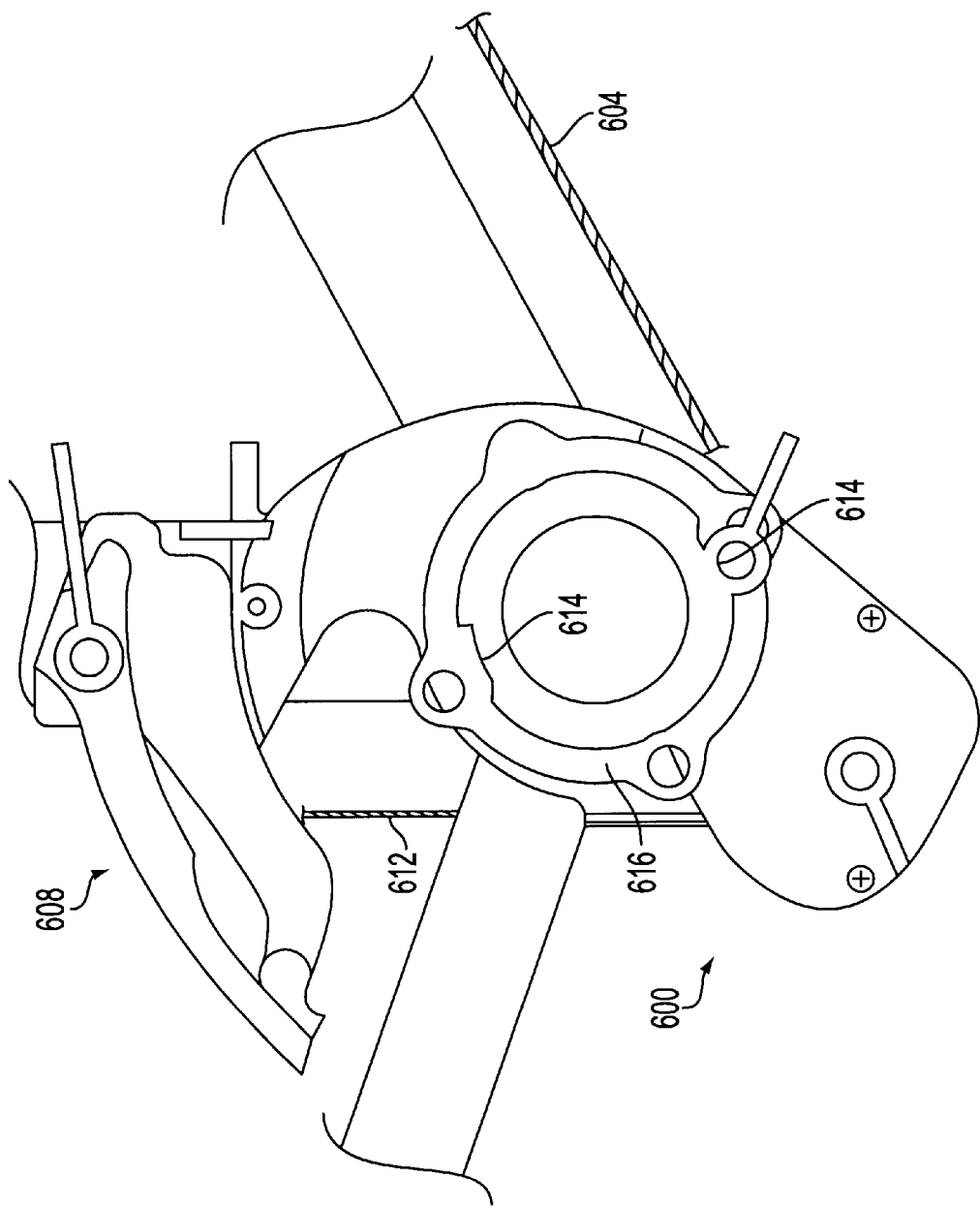
FIG. 20 is a side view of a second embodiment of an assisting apparatus according to the present invention.

FIG. 20 is a side view of a second embodiment of an assisting apparatus 600 according to the present invention. Assisting apparatus 600 receives shift commands from an input control wire 604 for controlling a front derailleur 608 by pulling and releasing an output control wire 612. Assisting apparatus 600 uses the power from one of two drive teeth 614 formed on the inner peripheral surface of a rotating member 616 that rotates integrally and coaxially with the front sprockets (such as sprockets 62 shown in FIG. 1) to assist the operation of front derailleur 608.

Figure 21:
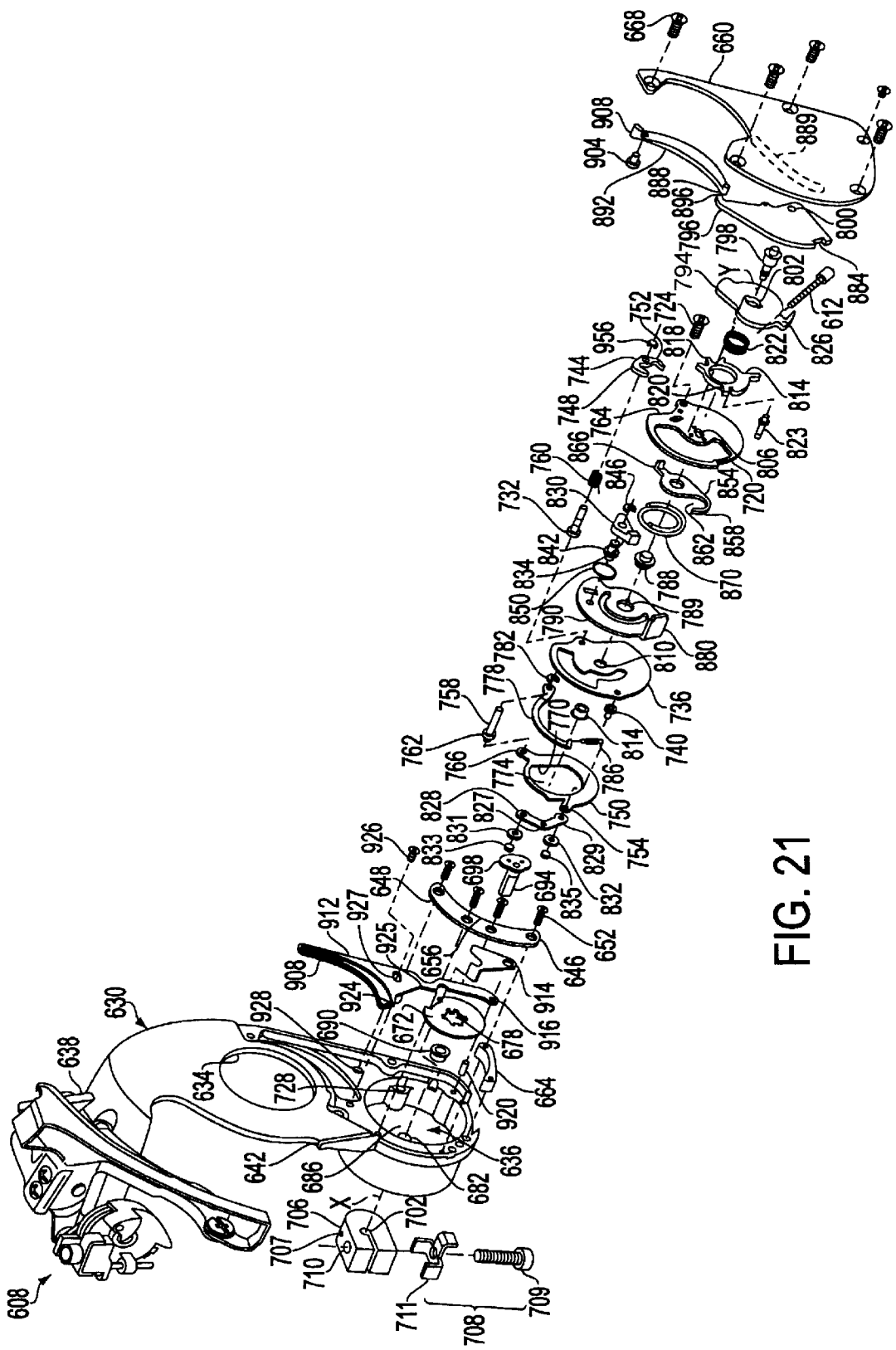
FIG. 21 is an exploded view of the assisting apparatus shown in FIG. 20.

FIG. 21 is an exploded view of assisting apparatus 600. In this embodiment, assisting apparatus 600 includes a main housing 630 that defines an opening 634 that aligns with the opening in bottom bracket 32, a main chamber 636 that houses the components described below, a flange assembly 638 that forms the base member of front derailleur 608, and a wire guiding groove 642 for output control wire 612. Spacers 646 and 648 are fixed to main housing 630 using screws 652 to form a wire exit passage 656 that allows output control wire 612 to exit main chamber 636. A cover 660 and spacer 664 are fixed to main housing 630 using screws 668 to prevent contaminants from entering main chamber 636.

A washer 672 having an opening 678 that aligns with an opening 682 located at an inner side wall 686 of main housing 630 is placed against inner side wall 686, and a tubular bearing 690 is inserted through openings 678 and 682. A coupling shaft 694 integrally formed with a cam 698 extends though tubular bearing 690 and is fixed within an opening 702 of an input transmission member 706 SO that cam 698 and input transmission member 706 rotate as a unit. Input transmission member 706 includes an input control wire winding surface 707 and a wire coupler 708 comprising screw 709 and a wire receiving member 711. Screw 709 screws into a threaded opening 710 in input transmission member 706 50 that input control wire 604 is firmly sandwiched between input transmission member 706 and wire receiving member 711. In this embodiment, pulling input control wire 604 causes input transmission member 706 to rotate counterclockwise around a rotational axis X, and releasing input control wire 604 causes input transmission member 706 to rotate clockwise around rotational axis X. As with the first embodiment, if there are three front sprockets 62, input transmission member 706 is designed to move to three distinct input positions.

A fixing plate 720 is fixed to main housing 630 by a screw 724 that screws into a threaded opening 728 in main housing 630. A pawl support shaft 732 is mounted to one side of a support plate 736, and a position sensing member support shaft 740 that is fitted within an opening (not shown) in inner side wall 686 of main housing 630 is mounted to the opposite side of support plate 736. A position maintaining pawl 744 having pawl teeth 748 and 752 is rotatably mounted to the end of pawl support shaft 732 by a C-clip 956. Position maintaining pawl 744 is biased in the counterclockwise direction by a spring 760 disposed around pawl support shaft and connected to support plate 736 and position maintaining pawl 744. When assisting apparatus 600 is in the assembled state, pawl support shaft 732 extends over an edge 764 of fixing plate 720 50 that position maintaining pawl 744 is supported in front of fixing plate 720.

A position sensing member (or unit) 750 is pivotably mounted to position sensing member support shaft 740 through a mounting ear 754. A control shaft 758 having a collar 762 is mounted to another mounting ear 766 on position sensing member 750. Position sensing member 750 includes an inner peripheral surface 770 or position sensing arc defining a cam follower opening 774. One end of a pawl guide member 778 is pivotably mounted to control shaft 758 adjacent to collar 762 and held in place with a C-clip 782. Pawl guide member 778 is biased in a counterclockwise direction by a spring 786 connected between the free end of pawl guide member 778 and mounting ear 754. Pawl guide member 778 forms a pawl guide channel 780 (FIG. 23) with the outer peripheral surface of position sensing member 750. These surfaces form pawl directing surfaces that function in a manner described below.

A tubular bearing 788 is mounted in a central opening 789 in a drive plate 790, and drive plate 790, an output transmission member 794 and a motion transmitting member 796 are rotatably supported on a shaft 798 that extends through a corner opening 800 in motion transmitting member 796, through a central opening 802 in output transmission member 794, through a central opening 806 in fixing plate 720, through tubular bearing 788, through a central opening 810 in support plate 736, and into a threaded nut 814. A ratchet 814 having a plurality of position maintaining teeth 818 and a plurality of drive surfaces 820 is fixed to output transmission member 794. Output transmission member 794 and ratchet 814 are biased in a clockwise direction by a spring 822 connected between fixing plate 720 and output transmission member 794. Output transmission member 794 includes a wire terminating recess 826 for receiving a wire end bead 825 attached to the end of output control wire 612. A cam follower 827 having a first arm 828 and a second arm 829 is pivotably mounted to ratchet 814 through a pivot shaft 823. As a result of this structure, output transmission member 794, ratchet 814 and cam follower 827 rotate as a unit around a rotational axis Y which, in this embodiment, is coaxial with rotational axis X for input transmission member 706. Position sensing member engaging members in the form of cam follower rollers 831 and 832 are rotatably mounted to the ends of first and second arms 828 and 829 through pivot screws 833 and 835, respectively In the assembled state, cam follower rollers 831 and 832 are disposed between cam 698 and the inner peripheral surface 770 of position sensing member 750.

A motion transmitting pawl 830 having a drive tooth 834 and a control shaft 838 (FIG. 28) is pivotably mounted to drive plate 790 through a pivot shaft 842 and held in place with a C-clip 846. Drive tooth 834 engages one of the plurality of drive surfaces on 820 on ratchet 814 in a manner described below. Motion transmitting pawl 830 is biased in the counterclockwise direction by a spring 850 connected between drive plate 790 and motion transmitting pawl 830. A position release plate 854 having a motion transmitting pawl engaging projection 858, a motion transmitting pawl receiving recess 862 and a pawl release member in the form of a pawl release projection 866 is rotatably supported on tubular bearing 788. Position release plate 854 is biased in a clockwise direction by a spring 870 connected between drive plate 790 and position release plate 854.

A coupling tab 880 extending from drive plate 790 is fitted within a coupling recess 884 formed in motion transmitting member 796 so that drive plate 790 and motion transmitting member 796 rotate as a unit around shaft 798. A coupling post 888 disposed at one end of a rotating member engaging member in the form of a rotating member engaging pawl 892 is disposed in a coupling recess 896 formed at an upper corner of motion transmitting member 796 and slides within a guide recess 889 formed in the inner surface of cover 660. A rotating member engaging tooth 900 is formed at the other end of rotating member engaging pawl 892 for engaging one of the drive teeth 614 on rotating member 616 in a manner described below. A control pin 904 is fastened to rotating member engaging pawl 892 in close proximity to rotating member engaging tooth 900 and extends through a guide slot 908 formed in a pawl control member 912. A lower end 916 of pawl control member 912 is pivotably connected to main housing 630 through a pivot shaft 920, and pawl control member 912 is biased in a counterclockwise direction by a spring 914 connected between pawl control member 912 and main housing 630. When assisting apparatus in the assembled state, control shaft 758 contacts a control surface 924, including a home location 925, defined by the inner edge of pawl control member 912. The stability of pawl control member 912 is enhanced by a guide screw 926 that extends through an elongated slot 927 in pawl control member and into a threaded opening 928 in main housing 630.

Figure 22:
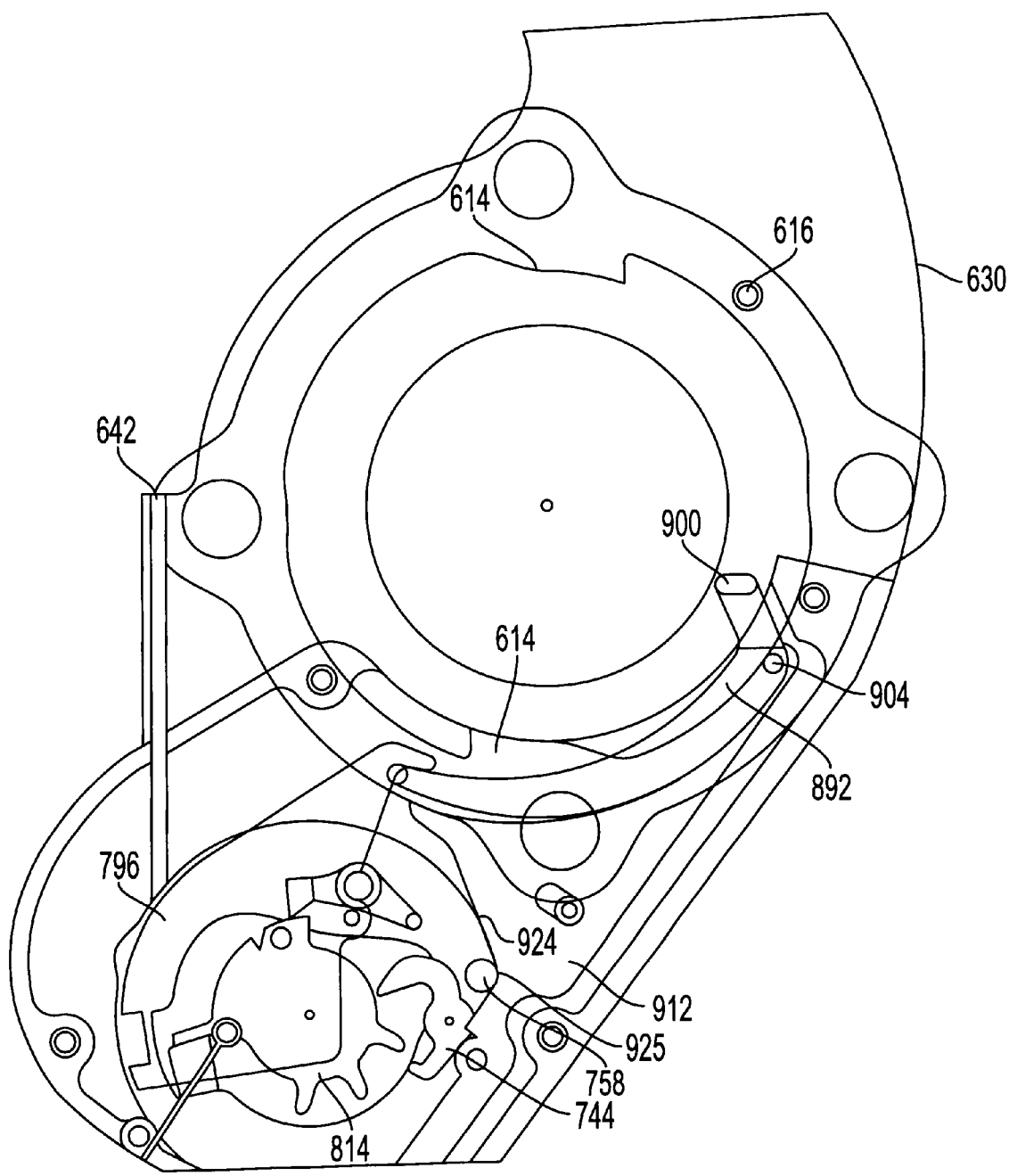
FIG. 22 is a side view of the assisting apparatus showing the rotating member engaging pawl in a rotating member disengaged position.
Figure 24:
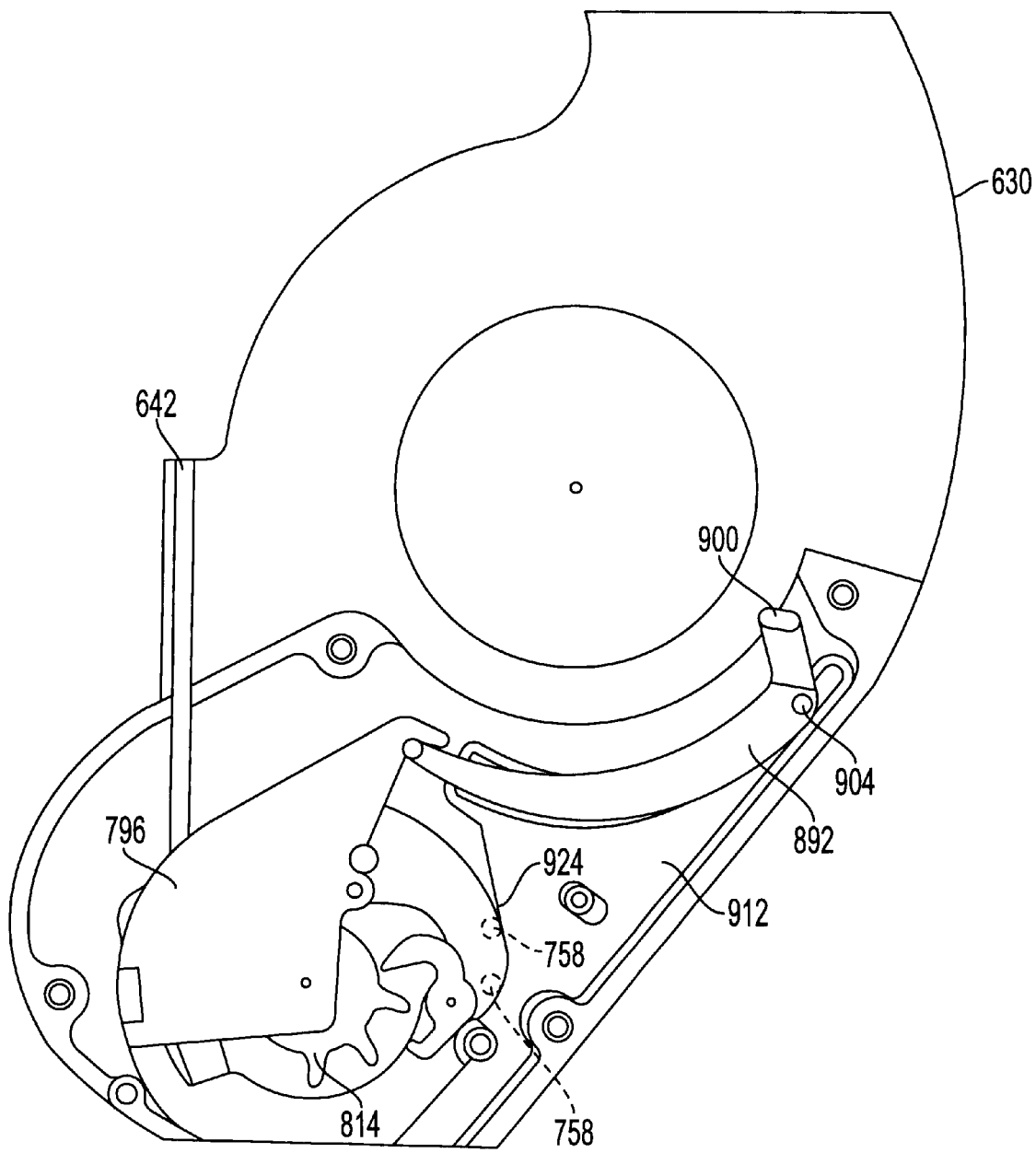
FIG. 24 is a side view of the assisting apparatus showing the rotating member engaging pawl in a rotating member engaging position.

In this embodiment, rotating member engaging pawl 892, motion transmitting member 796, drive plate 790, pawl coupler 842, motion transmitting pawl 830 and ratchet 814 constitute a motion transmitting mechanism for communicating rotational motion of axle 90 to output transmission member 794. Furthermore, in this embodiment, pawl control member 912, position sensing member 750, cam 698 and cam follower 827 constitute a switching mechanism for moving pawl 892 to a rotating member engaging position (FIG. 24) when the input transmission member 706 is in one of the first input position, second input position or third input position and the output transmission member 794 is not in the corresponding first output position, second output position, or third output position, and for moving the pawl 892 to the rotating member disengaged position (FIG. 22) when the input transmission member 706 is in one of the first input position, second input position or third input position and the output transmission member 794 is in the corresponding first output position, second output position, or third output position.

Figure 23:
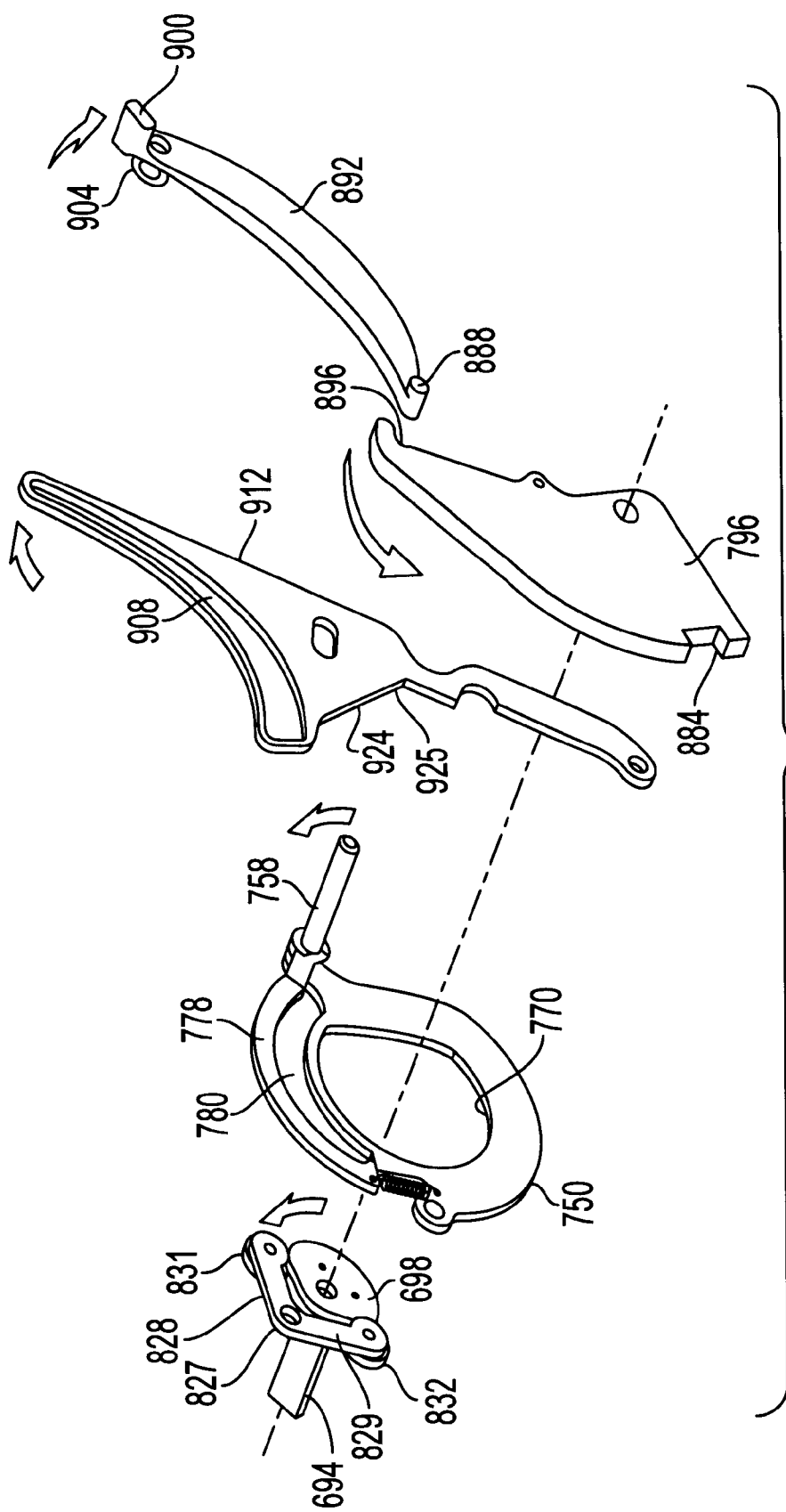
FIG. 23 is an exploded view showing the operation of the input transmission member, position sensing member and rotating member engaging pawl at the beginning of an upshift operation.

Operation of assisting apparatus 600 when performing an upshifting operation (e.g., from the smallest front sprocket to a larger (intermediate size) sprocket) may be understood by referring to FIGS. 22–27C. An upshifting operation is performed by pulling input control wire 604 which, in turn, causes input transmission member 706 to rotate counterclockwise to an upshifting position relative to output transmission member 794. As shown in FIGS. 23 and 25A, the counterclockwise rotation of input transmission member 706 is communicated to cam 698 through coupling shaft 694. The larger diameter surface of cam 698 presses against roller 831 which, in turn, presses against the inner peripheral surface 770 of position sensing member 750, thus causing position sensing member 750 to rotate eccentrically in the counterclockwise direction around position sensing member support shaft 740. The counterclockwise rotation of position sensing member 750 allows motion transmitting pawl 830 to rotate counterclockwise as a result of the biasing force of spring 850 to the position shown in FIGS. 25B and 25C. The counterclockwise rotation of position sensing member 750 also causes control shaft 758 to press upwardly on control surface 924 of pawl control member 912 to thereby rotate pawl control member 912 clockwise from a switch-off position shown in FIG. 22 to a switch-on position shown in FIG. 24. The clockwise rotation of pawl control member 912 likewise allows rotating member engaging pawl 892 to move from the rotating member disengaged position shown in FIG. 22 to the rotating member engaging position shown in FIG. 24.

Figure 25C:
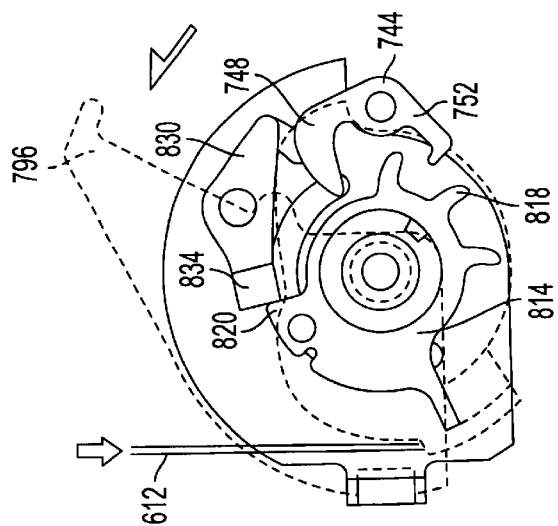
FIG. 25C is a view showing the operation of the position maintaining mechanism at the beginning of the upshift operation.
Figure 25B:
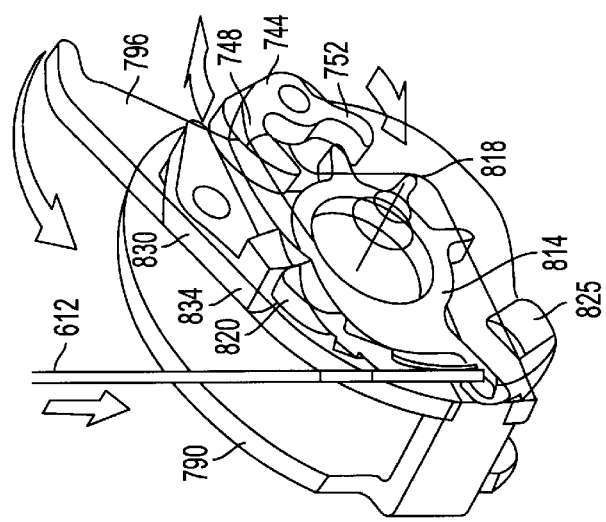
FIG. 25B is a view showing the operation of the motion transmitting member and the output transmission member at the beginning of the upshift operation.
Figure 25A:
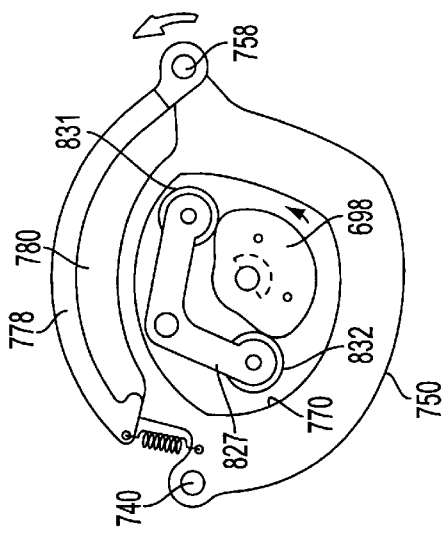
FIG. 25A is a view of the cam, cam follower and position sensing member at the beginning of the upshift operation.
Figure 26C:
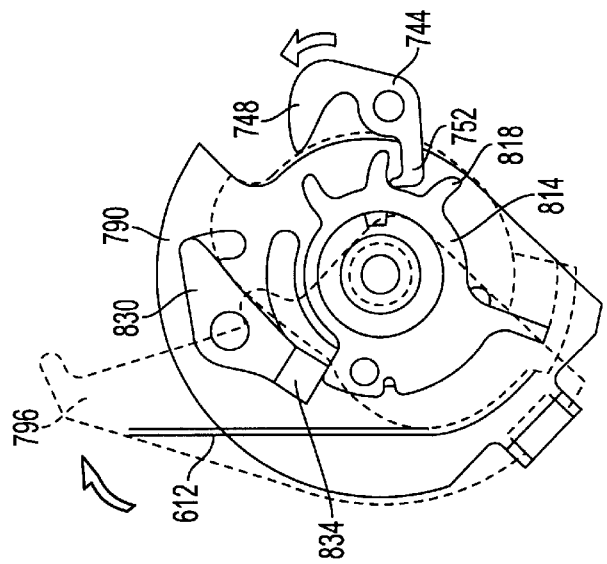
FIG. 26C is a view showing the operation of the operation of the position maintaining mechanism at the intermediate stage of the upshift operation.

When rotating member engaging pawl 892 engages one of the drive teeth 614 on rotating member 616, the rotational power of rotating member 616 is communicated to motion transmitting member 796, thus causing motion transmitting member 796, drive plate 790 and motion transmitting pawl 830 to rotate counterclockwise. Since motion transmitting pawl 830 is in the counterclockwise rotated position, drive tooth 834 of motion transmitting pawl 830 engages the nearest drive surface 820 on ratchet 814, thus causing ratchet 814, output transmission member 794 and cam follower 827 to rotate counterclockwise as shown in FIGS. 25B and 25C. As a result, output transmission member 794 pulls on output control wire 612, and position maintaining tooth 748 of position maintaining pawl 744 rides up and over the most counterclockwise position maintaining tooth 818 of ratchet 814 as shown in FIG. 26C. Motion transmitting pawl 830 is received in the motion transmitting pawl receiving recess 862 of position release plate 854, so position release plate 854 remains inoperative.

Figure 26B:
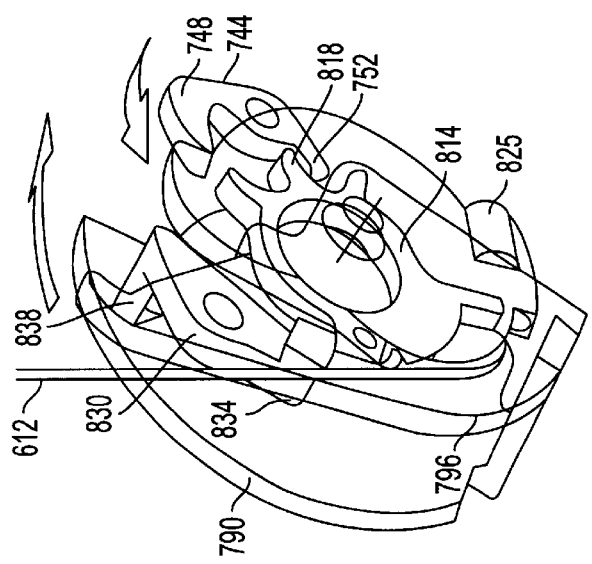
FIG. 26B is a view showing the operation of the motion transmitting member and the output transmission member at the intermediate stage of the upshift operation.
Figure 26A:
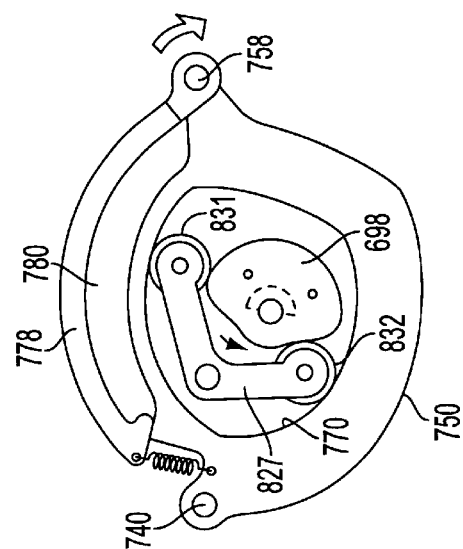
FIG. 26A is a view of the cam, cam follower and position sensing member at an intermediate stage of the upshift operation.
Figure 27C:
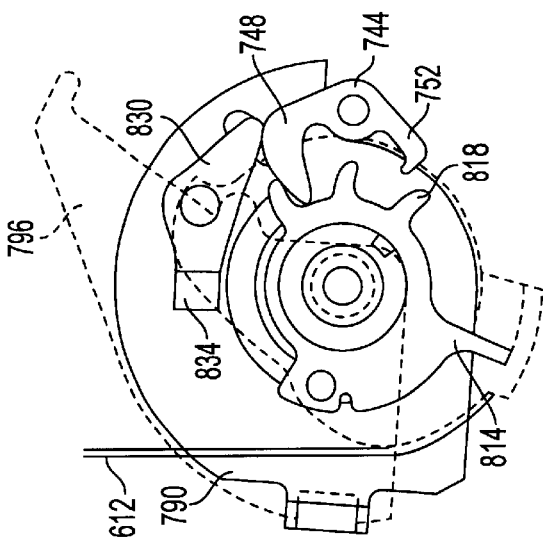
FIG. 27C is a view showing the operation of the operation of the position maintaining mechanism at the final stage of the upshift operation.
Figure 27B:
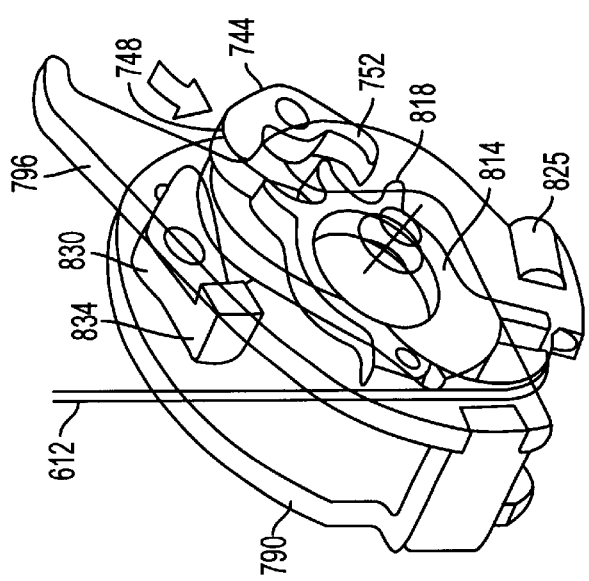
FIG. 27B is a view showing the operation of the motion transmitting member and the output transmission member at the final stage of the upshift operation.
Figure 27A:
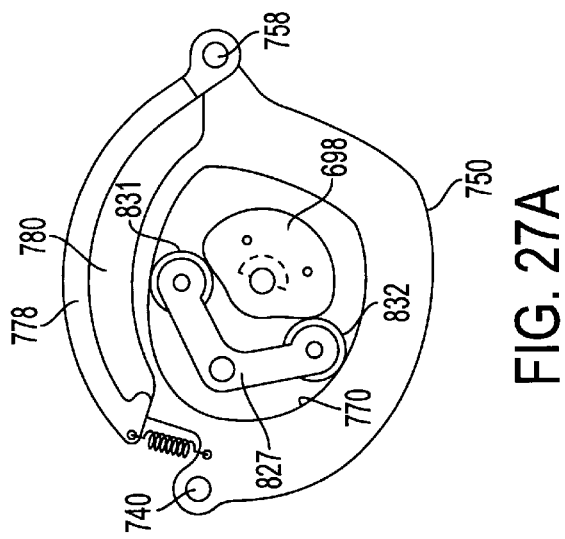
FIG. 27A is a view of the cam, cam follower and position sensing member at the final stage of the upshift operation.
Figure 29C:
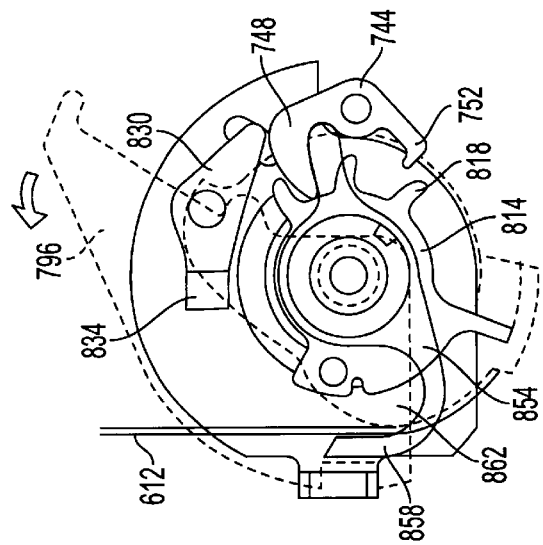
FIG. 29C is a view showing the operation of the position maintaining mechanism at the beginning of the downshift operation.
Figure 29B:
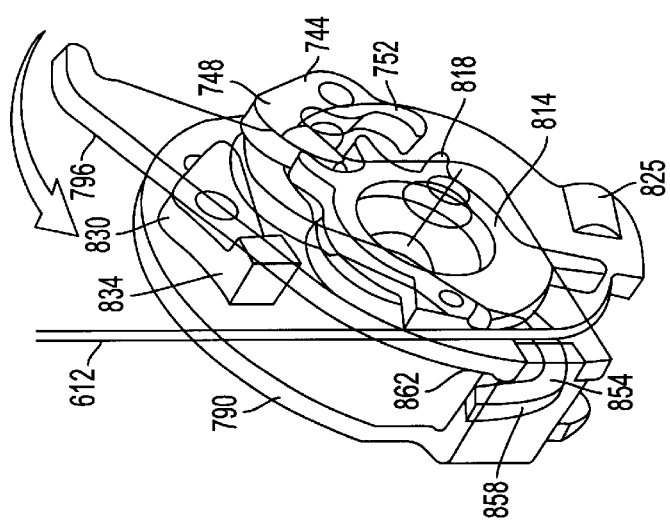
FIG. 29B is a view showing the operation of the motion transmitting member and the output transmission member at the beginning of the downshift operation.
Figure 29A:
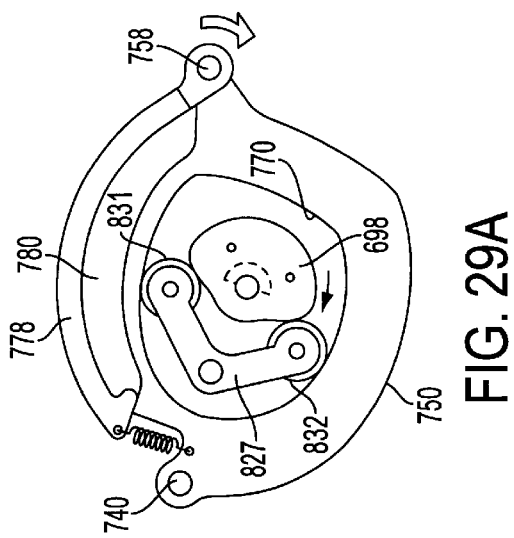
FIG. 29A is a view of the cam, cam follower and position sensing member at the beginning of the downshift operation.
Figure 32C:
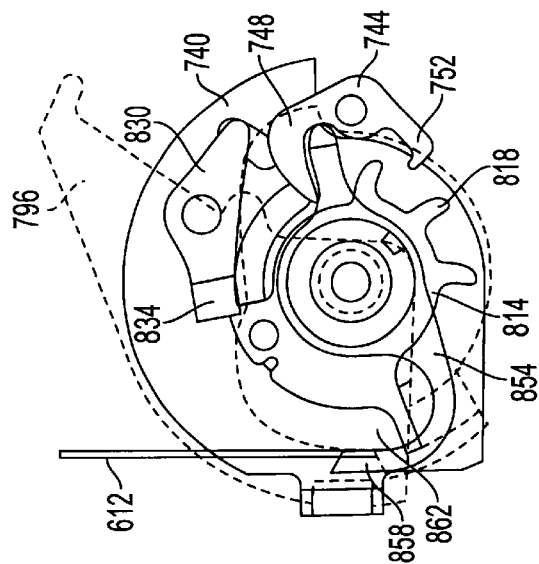
FIG. 32C is a view showing the operation of the operation of the position maintaining mechanism at the final stage of the downshift operation.
Figure 32B:
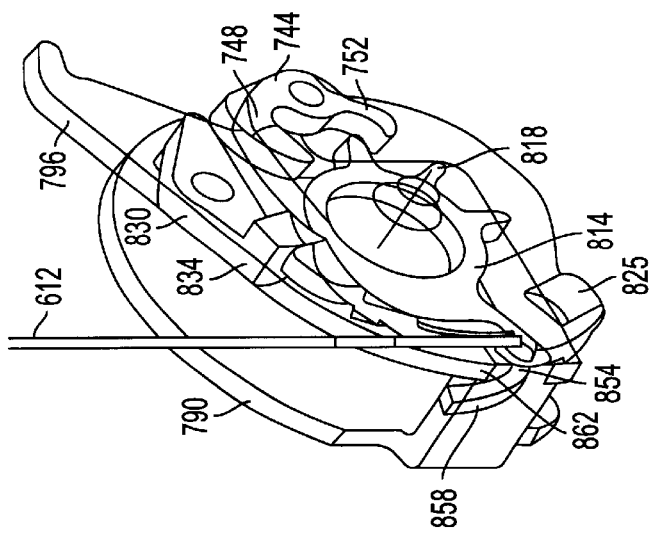
FIG. 32B is a view showing the operation of the motion transmitting member and the output transmission member at the final stage of the downshift operation.
Figure 32A:
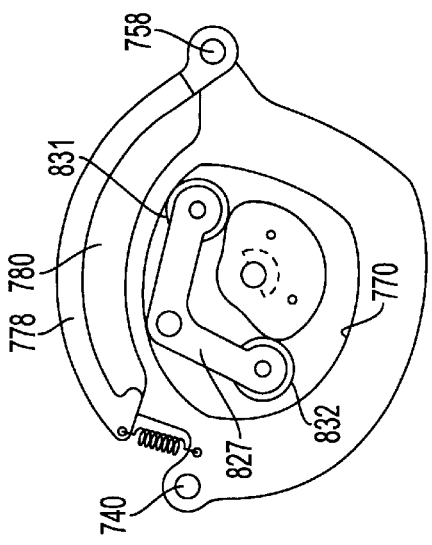
FIG. 32A is a view of the cam, cam follower and position sensing member at the final stage of the downshift operation.

As cam follower 827 rotates counterclockwise with output transmission member 794, the larger diameter surface of cam 698 presses against roller 832 on cam follower 827, and roller 832 presses against the inner peripheral surface 770 of position sensing member 750. This, in turn, causes position sensing member 750 to rotate clockwise around position sensing member support shaft 740 as shown in FIG. 26A. As a result, control shaft 758 moves to the home location 925 on control surface 924 of pawl control member 912, thus allowing pawl control member 912 to rotate counterclockwise to the switch-off position in accordance with the biasing force of spring 914. Thus, when rotating member engaging pawl 892 disengages from drive tooth 614 of rotating member 616 in a manner described below, motion transmitting member 796 rotates clockwise as shown in FIGS. 26B and 26C so that rotating member engaging pawl 892 moves to the rotating member disengaged position shown in FIG. 22. Output transmission member 794 and ratchet 814 initially follow the clockwise rotation of motion transmitting member 796, but since position maintaining pawl 744 is biased in the counterclockwise direction, pawl tooth 748 abuts against the right side surface of the most counterclockwise position maintaining tooth 818, and thereby maintains output transmission member 794 in the desired upshifted position as shown in FIGS. 27B and 27C. At that time, cam follower 827 and position sensing member 750 are in the neutral position as shown in FIG. 27A. As with the first embodiment, the foregoing movements also provide an overshift function.

Operation of assisting apparatus 600 when performing a downshifting operation (e.g., from the intermediate size front sprocket to the smallest front sprocket) may be understood by referring to FIGS. 22, 24 and 28–32C. A downshifting operation is performed by releasing input control wire 604 which, in turn, causes input transmission member 706 to rotate clockwise to a downshifting position relative to output transmission member 794. As shown in FIGS. 28 and 29A, the clockwise rotation of input transmission member 706 is communicated to cam 698 through coupling shaft 694. The larger diameter surface of cam 698 presses against roller 832 which, in turn, presses against the inner peripheral surface 770 of position sensing member 750, thus causing position sensing member 750 to rotate in the clockwise direction around position sensing member support shaft 740. The clockwise rotation of position sensing member 750 causes guide channel 780 to press downwardly on control shaft 838 of motion transmitting pawl 830, thus causing motion transmitting pawl 830 to rotate clockwise to the position shown in FIGS. 29B and 29C. The clockwise rotation of position sensing member 750 also causes control shaft 758 to press downwardly on control surface 924 of pawl control member 912 to thereby rotate pawl control member 912 clockwise to the switch-on position. The clockwise rotation of pawl control member 912 again allows rotating member engaging pawl 892 to move from the rotating member disengaged position shown in FIG. 22 to the rotating member engaging position shown in FIG. 24.

When rotating member engaging pawl 892 engages one of the drive teeth 614, the rotational power of rotating member 616 is communicated to motion transmitting member 796, thus causing motion transmitting member 796, drive plate 790 and motion transmitting pawl 830 to rotate counterclockwise. Since motion transmitting pawl 830 is in the clockwise rotated position, pawl guide channel 780 causes drive tooth 834 of motion transmitting pawl 830 to engage motion transmitting pawl engaging projection 858 of position release plate 854 as shown in FIGS. 30A and 30B. As motion transmitting pawl 830 continues to rotate counterclockwise, position release plate 854 also rotates counterclockwise so that pawl release projection 866 presses against pawl tooth 748 of position maintaining pawl 744 and causes position maintaining pawl 744 to rotate clockwise. When pawl tooth 748 clears the tip of the most counterclockwise position maintaining tooth 818 as shown in FIGS. 31B and 31C, ratchet 814, output transmission member 794 and cam follower 827 rotate clockwise, releasing output control wire 612, until the middle position maintaining tooth 818 of ratchet 814 abuts against pawl tooth 752 of position maintaining pawl 744.

As cam follower 827 rotates clockwise with output transmission member 794, the larger diameter surface of cam 698 presses against roller 831 on cam follower 827, and roller 831 presses against the inner peripheral surface 770 of position sensing member 750. This, in turn, causes position sensing member 750 to rotate counterclockwise around position sensing member support shaft 740 as shown in FIG. 31A. As a result, control shaft 758 moves to the home location 925 on control surface 924, thus allowing pawl control member 912 to rotate counterclockwise in accordance with the biasing force of spring 914 to the switch-off position. Thus, when rotating member engaging pawl 892 disengages from drive tooth 614 of rotating member 616, motion transmitting member 796 rotates clockwise as shown in FIGS. 31B and 31C so that rotating member engaging pawl 892 moves to the rotating member disengaged position shown in FIG. 22. As motion transmitting pawl 830 moves clockwise, position release plate 854 likewise rotates clockwise so that pawl release projection 866 stops pressing against pawl tooth 748 of position maintaining pawl 744. Position maintaining pawl 744 then rotates counterclockwise in accordance with the biasing force of spring 760, thus allowing ratchet 814, output transmission member 794 and cam follower to move to the final position shown in FIGS. 32B and 32C. At that time, cam follower 827 and position sensing member 750 are in the neutral position shown in FIG. 32A.

Figure 33:
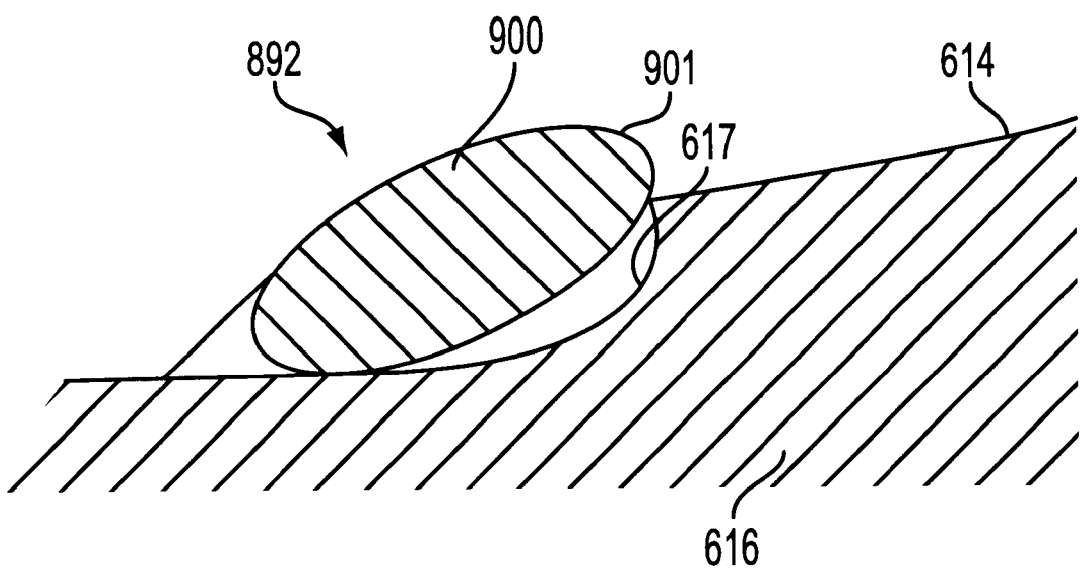
FIG. 33 is a detailed view showing the disengagement of the rotating member engaging pawl from the rotating member.

FIG. 33 is a detailed view showing how rotating member engaging pawl 892 disengages from a drive tooth 614 of rotating member 616. When rotating member engaging pawl 892 first engages drive tooth 614, a curved side edge 901 of rotating member engaging tooth 900 contacts a concave recess 617 of drive tooth 614, and rotating member engaging pawl 892 rotates together with rotating member 616. At the same time, coupling post 888 slides within guide recess 889. As motion transmitting member 796 reaches the end of its stroke, guide recess 889 causes rotating member engaging pawl 892 and hence rotating member engaging tooth 900 to rotate slightly counterclockwise to the position shown in FIG. 33 to unlock rotating member engaging tooth 900 from drive tooth 614. Further rotation of rotating member 616 causes rotating member engaging tooth 900 to ride up over drive tooth 614, and rotating member engaging pawl 892 thereafter returns to the home position.

As with the first embodiment, assisting apparatus 600 can be used with more than two front sprockets, and multiple shifts can be performed at the same time. This is possible because further rotation of input transmission member 706 merely causes cam 698 to rotate so that a larger arc of the larger diameter surface of cam 698 is disposed under either roller 831 or roller 832. Thus, as output transmission member 794 and cam follower 827 rotate to the next successive gear positions, position sensing member 750 will keep pawl control member 912 in the switch-on position, and rotating member engaging pawl 892 will successively engage the drive surfaces 614 of rotating member 616 until the position of output transmission member 794 corresponds to the desired gear indicated by input transmission member 706.

Figure 34:
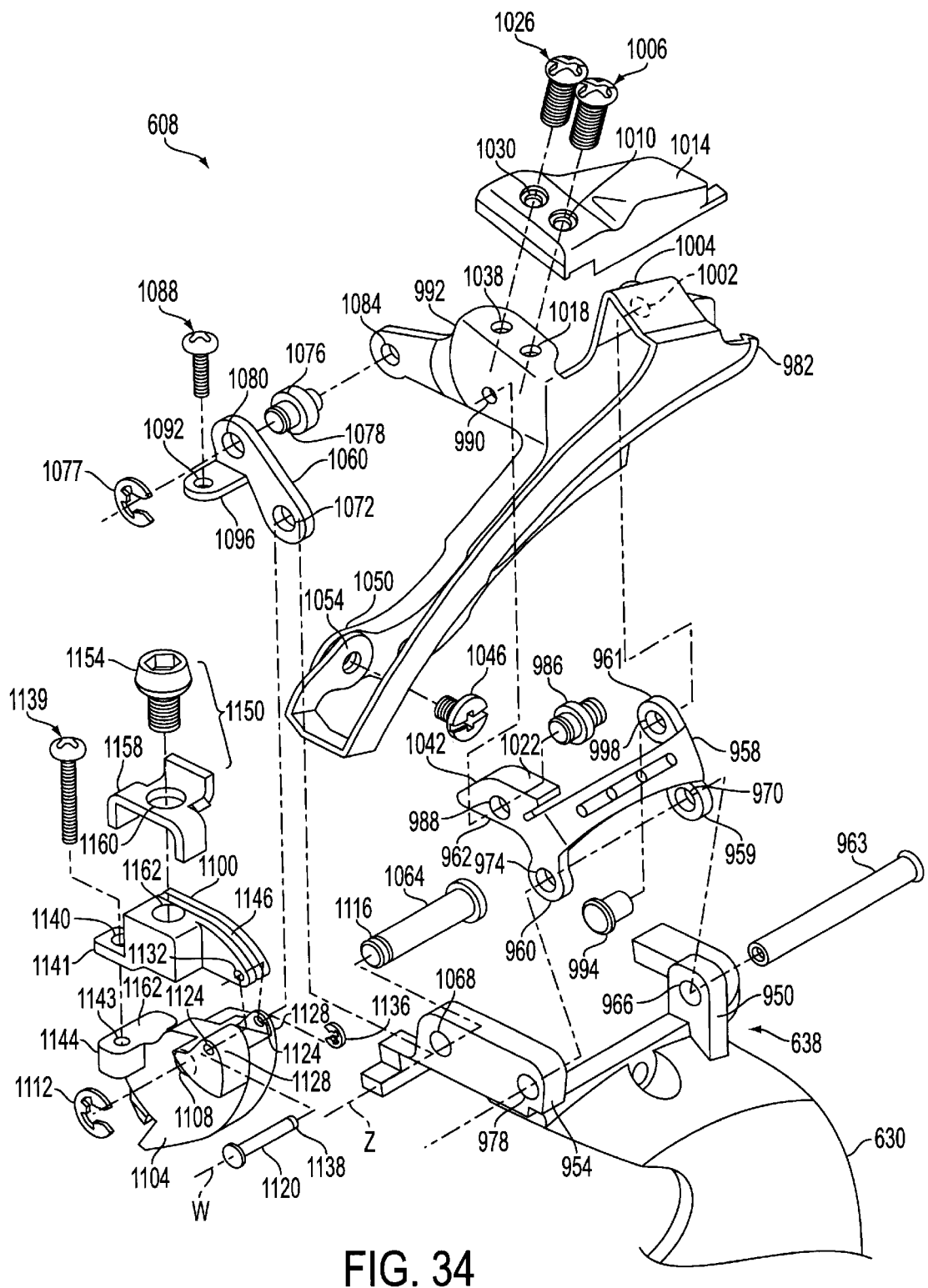
FIG. 34 is an exploded view of the front derailleur shown in FIG. 21.

FIG. 34 is an exploded view of the front derailleur shown in FIG. 21. As shown therein, flange assembly 638 (which functions as a base member for derailleur 608) includes a coupling ear 950 and a coupling ear 954. A link member 958 having coupling ears 959, 960, 961 and 962 is pivotably coupled to coupling ears 950 and 954 by a press-fit pivot pin 963 that extends through an opening 966 in coupling ear 950, through an opening 970 in coupling ear 959, through an opening 974 in coupling ear 960, and through an opening 978 in coupling ear 954. A chain guide 982 is pivotably connected to link member 958 through a press fit pivot pin 986 that extends through an opening 988 in coupling ear 962 and through an opening 990 in a movable member 992 that supports chain guide 982, and through a press-fit pivot pin 994 that extends through an opening 998 in coupling ear 961 and through an opening 1002 in another movable member 1004 that supports chain guide 982.

A top gear position adjusting bolt 1006 extends through an opening 1010 in a cover 1014 and through an opening 1018 in movable member 992 for contacting an abutment 1022 on coupling ear 962 to set the top gear position limit in a known manner. Similarly, a low gear position adjusting bolt 1026 extends through an opening 1030 in cover 1014 and through an opening 1038 in movable member 992 for contacting an abutment 1042 on coupling ear 962 to set the low gear position limit in a known manner. A plate connecting bolt 1046 detachably connects plate ends 1050 and 1054 of chain guide 982 together in a known manner to allow insertion of a chain into chain guide 982 during servicing.

One end of a first actuating unit in the form of an actuating arm 1060 is pivotably connected to coupling ear 954 by a pivot pin 1064 that extends through an opening 1068 in coupling ear 954 and through an opening 1072 in actuating arm 1060 so that actuating arm 1060 rotates around an axis Z. The other end of actuating arm 1060 is pivotably connected to movable member 992 by a pivot pin 1076 that extends through an opening 1080 in actuating arm 1060 and through an opening 1084 in movable member 992. Actuating arm 1060 is held in place on pivot pin 1076 by a C-clip 1077 that engages a groove 1078 in pivot pin 1076. Thus, flange assembly 638, link member 958, movable members 992 and 1004, and actuating arm 1060 form a four-bar link type mechanism that allows chain guide 982 to move relative to flange assembly 638 in response to rotation of actuating arm 1060. Actuating arm 1060 further includes a position adjusting screw 1088 that extends through a threaded opening 1092 in a position adjusting ear 1096 extending perpendicularly from the side of actuating arm 1060. The function of position adjusting screw 1088 is described below.

A second actuating unit comprising a first actuating member 1100 and a second actuating member 1104 is pivotably coupled to pivot pin 1064 through an opening 1108 in second actuating member 1104. Thus, second actuating member 1104 and actuating arm 1060 both rotate around axis Z, and they are held in place by a C-clip 1112 that engages a groove 1116 in pivot pin 1064. One end of first actuating member 1100 is pivotably connected to one end of second actuating member 1104 through a pivot shaft 1120 that extends through openings 1124 in coupling ears 1128 in second actuating member 1104 and through an opening 1132 in first actuating member 1100 that is located between coupling ears 1128. Pivot pin 1120 defines a rotational axis Z, and it is held in place by a C-clip 1136 that engages a groove 1138 in pivot pin 1120. The other ends of first actuating member 1100 and second actuating member 1104 are adjustably coupled together by a position adjusting screw 1139 that extends through a threaded opening 1140 in a coupling ear 1141 of first actuating member 1100 and into a threaded opening 1143 in a coupling ear 1144 of second actuating member 1104.

Figure 35:
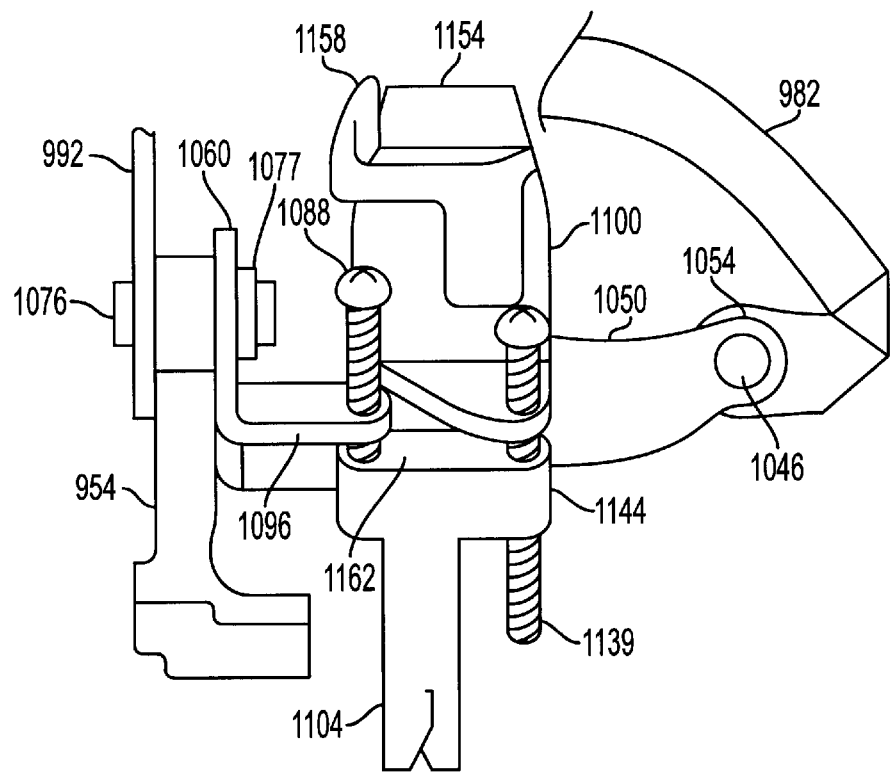
FIG. 35 is a detailed view of the stroke adjust mechanism for the front derailleur in the assembled state.

First actuating member 1100 includes a wire winding surface 1146 for winding output control wire 612. A wire coupler 1150 comprising a screw 1154 and a wire receiving member 1158 is attached to first actuating member 1100. Screw 1154 extends through an opening 1160 in wire receiving member 1158 and screws into a threaded opening 1162 in first actuating member 1100 so that output control wire 612 is firmly sandwiched between first actuating member 1100 and wire receiving member 1158. As shown in FIG. 35, the end face of position adjusting screw 1088 contacts an abutment 1162 formed on coupling ear 1144 of second actuating member 1104. Thus, pulling output control wire 612 causes first actuating member 1100, second actuating member 1104 and actuating arm 1060 to rotate clockwise as a unit against the biasing force of a conventional return spring (not shown), hence causing chain guide 982 to move to the right in FIG. 21. Conversely, releasing output control wire 612 causes first actuating member 1100, second actuating member 1104 and actuating arm 1060 to rotate counterclockwise as a unit in accordance with the biasing force of the return spring, thus causing chain guide 982 to move to the left in FIG. 21.

Figure 36:
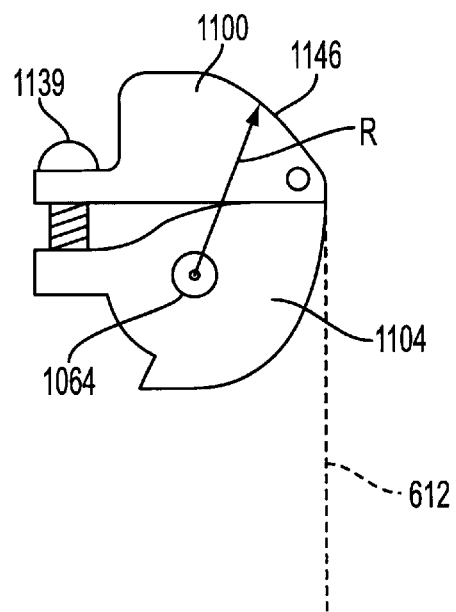
FIG. 36 is a schematic view showing the operation of the stroke adjusting mechanism shown in FIG. 35.

It should be readily apparent that the relative rotational position between the first actuating unit (actuating arm 1060) and the second actuating unit (first actuating member 1100 and second actuating member 1104) can be adjusted by rotating position adjusting screw 1088. Also, as shown in FIG. 36, turning position adjusting screw 1139 causes the winding radius R for winding surface 1146, especially the portion of winding surface 1146 closest to adjusting screw 1139, to increase or decrease accordingly. This, in turn, causes the cable pull rate to vary depending not only upon the winding radius R but also upon the overall rotational position of first actuating member 1100 and second actuating member 1104. Thus, by selecting a desired curvature for winding surface 1146 and setting position adjusting screw 1139 accordingly, a particular cable pull rate characteristic can be obtained, and the rotational position of first actuating member 1100 and second actuating member 1104 at which the cable pull rate characteristic occurs can be selected by setting position adjusting screw 1088. This provides tremendous flexibility to accommodate derailleurs having different and varying actuation ratios.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An assisting apparatus for using power from a rotating member to assist the operation of a bicycle transmission comprising:

a mounting unit;

an input transmission member coupled to the mounting unit, wherein the input transmission member moves to at least a first input position, a second input position and a third input position;

an output transmission member coupled to the mounting unit, wherein the output transmission member moves to at least a first output position, a second output position, and a third output position corresponding to the first input position, the second input position and the third input position of the input transmission member, respectively;

a rotating member engaging member that moves between a rotating member engaging position and a rotating member disengaging position;

a motion transmitting mechanism for transmitting motion from the rotating member engaging member to the output transmission member; and a switching mechanism for moving the rotating member engaging member to the rotating member engaging position when the input transmission member is in one of the first input position, second input position or third input position and the output transmission member is not in the corresponding first output position, second output position, or third output position, and for moving the rotating member engaging member to the rotating member disengaging position when the input transmission member is in one of the first input position, second input position or third input position and the output transmission member is in the corresponding first output position, second output position, or third output position.

2. The apparatus according to claim 1 wherein the input transmission member includes an input control wire coupler for coupling an input control wire thereto.

3. The apparatus according to claim 2 wherein the input transmission member includes an input control wire winding surface.

4. The apparatus according to claim 1 wherein the output transmission member includes an output control wire coupler for coupling an output control wire thereto.

5. The apparatus according to claim 4 wherein the output transmission member includes an output control wire winding surface.

6. The apparatus according to claim 1 wherein the motion transmitting mechanism comprises:
a ratchet including a drive surface coupled to the output transmission member; and
a motion-transmitting pawl for engaging the drive surface.

7. The apparatus according to claim 6 wherein the motion transmitting mechanism includes a drive shaft that rotates when the rotating member engaging member engages the rotating member, and wherein the motion transmitting pawl is coupled to the drive shaft.

8. The apparatus according to claim 7 wherein the rotating member engaging member comprises a rotating member engaging pawl coupled to the drive shaft.

9. The apparatus according to claim 8 wherein the ratchet includes a plurality of position maintaining teeth, and further comprising a position maintaining pawl that engages selected ones of the plurality of position maintaining teeth for maintaining the output transmission member in a selected position.

10. The apparatus according to claim 9 wherein the rotating member engaging pawl is coupled to a first end of the drive shaft, and wherein the motion transmitting pawl is coupled to a second end of the drive shaft.

11. The apparatus according to claim 1 wherein, when the input transmission member is located in the second input position and the output transmission member is located in the second output position and the input transmission member moves to at least one of the first input position or third input position, the output transmission member moves to the corresponding first output position or third output position.

12. The apparatus according to claim 1 wherein the input transmission member is coupled to the mounting unit for rotation around an input transmission member rotational axis, and wherein the output transmission member is coupled to the mounting unit for rotation around an output transmission rotational axis.

13. The apparatus according to claim 12 wherein the switching mechanism comprises a position sensing member operatively coupled to the input transmission member and to the output transmission member, wherein the position sensing member moves to a switch-on position when the input transmission member is in one of the first input position, second input position or third input position and the output transmission member is not in the corresponding first output position, second output position, or third output position, and wherein the position sensing member moves to a switch-off position when the input transmission member is in one of the first input position, second input position or third input position and the output transmission member is in the corresponding first output position, second output position, or third output position.

14. The apparatus according to claim 13 wherein the rotating member engaging member comprises a rotating member engaging pawl.

15. The apparatus according to claim 14 wherein the switching mechanism comprises:
a pawl moving member that moves the rotating member engaging pawl to the rotating member engaging position; and
a pawl retaining member that retains the rotating member engaging pawl in the rotating member disengaging position when the switching mechanism is in the switch-off position and that allows the pawl moving member to move the rotating member engaging pawl to the rotating member engaging position when the switching mechanism is in the switch-on position.

16. The apparatus according to claim 15 wherein the position-sensing member moves radially relative to the input transmission member.

17. The apparatus according to claim 16 wherein the switching mechanism further comprises a motion converting member for converting radial motion of the position sensing member to motion at least in part in the direction of the input transmission member rotational axis.

18. The apparatus according to claim 17 wherein the switching mechanism further comprises a push rod for communicating motion of the motion converting member to the pawl retaining member.

19. The apparatus according to claim 16 wherein the input transmission member rotational axis coincides with the output transmission member rotational axis.

20. The apparatus according to claim 19 wherein the switching mechanism further comprises an intermediate ring having a position sensing member engaging member that engages the position sensing member, and wherein the intermediate ring is rotated by the input transmission member.

21. The apparatus according to claim 20 wherein the switching mechanism further comprises an abutment for causing the intermediate ring to rotate eccentrically.

22. The apparatus according to claim 21 wherein the abutment is coupled to the output transmission member.

23. The apparatus according to claim 22 wherein the position sensing member includes a circumferentially extending surface defining a position sensing arc, wherein the position sensing member engaging member engages the position sensing arc, and wherein the abutment engages an inner peripheral surface of the intermediate ring.

24. The apparatus according to claim 23 wherein the position-sensing member engaging member comprises a roller.

25. The apparatus according to claim 13 wherein the motion transmitting mechanism comprises:
a ratchet including a drive surface coupled to the output transmission member; and
a motion transmitting pawl for engaging the drive surface.

26. The apparatus according to claim 25 wherein the ratchet includes a plurality of position maintaining teeth, and further comprising a position maintaining pawl that engages selected ones of the plurality of position maintaining teeth for maintaining the output transmission member in a selected position.

27. The apparatus according to claim 26 further comprising a release member for disengaging the position-maintaining pawl.

28. The apparatus according to claim 27 wherein the input transmission member rotates to an upshifting position relative to the output transmission member, and wherein the input transmission member rotates to a downshifting position relative to the output transmission member.

29. The apparatus according to claim 28 further comprising a pawl directing member, wherein the pawl directing member directs the motion transmitting pawl to engage the drive surface of the ratchet when the input transmission member rotates to one of the upshifting position or the downshifting position, and wherein the pawl directing member directs the motion transmitting pawl to engage the release member when the input transmission member rotates to the other one of the upshifting position or the downshifting position.

30. The apparatus according to claim 29 wherein the input transmission member rotates in a first direction to the upshifting position, and wherein the input transmission member rotates in a second direction opposite the first direction to the downshifting position.

31. The apparatus according to claim 30 wherein the pawl-directing member is coupled to the position-sensing member.

32. The apparatus according to claim 31 wherein the pawl-directing member is integral with the position-sensing member.

33. The apparatus according to claim 13 wherein the switching mechanism further comprises a cam operatively coupled to the input transmission member and to the position sensing member so that the cam moves the position sensing member to the switch-on position when the input transmission member is in one of the first input position, second input position or third input position and the output transmission member is not in the corresponding first output position.

34. The apparatus according to claim 33 wherein the cam is coupled for rotation with the input transmission member.

35. The apparatus according to claim 34 further comprising a cam follower for engaging the cam, wherein the cam follower is coupled for rotation with the output transmission member.

36. The apparatus according to claim 35 wherein the cam follower engages an inner peripheral surface of the position sensing member.

37. The apparatus according to claim 36 wherein the cam follower includes a roller for engaging the cam and the inner peripheral surface of the position sensing member.

38. The apparatus according to claim 36 wherein the input transmission member rotational axis coincides with the output transmission member rotational axis.

39. An assisting apparatus for using power from a rotating member to assist the operation of a bicycle transmission comprising:
 a mounting unit;
 an input transmission member coupled to the mounting unit for rotation around a rotational axis, wherein the input transmission member moves to at least a first input position and a second input position;
 an output transmission member coupled to the mounting unit for rotation around the rotational axis, wherein the output transmission member moves to at least a first output position and a second output position corresponding to the first input position and the second input position of the input transmission member, respectively;
 a rotating member engaging member that moves between a rotating member engaging position and a rotating member disengaging position;
 a motion transmitting mechanism for transmitting motion from the rotating member engaging member to the output transmission member; and
 a switching mechanism for moving the rotating member engaging member to the rotating member engaging position when the input transmission member is in one of the first input position or second input position and the output transmission member is not in the corresponding first output position or second output position, and for moving the rotating member engaging member to the rotating member disengaging position when the input transmission member is in one of the first input position or second input position and the output transmission member is in the corresponding first output position or second output position.

40. An assisting apparatus for using power from a rotating member to assist the operation of a bicycle transmission comprising:
 a mounting unit;
 an input transmission member coupled to the mounting unit, wherein the input transmission member moves to at least a first input position and a second input position;
 an output transmission member coupled to the mounting unit, wherein the output transmission member moves to at least a first output position and a second output position corresponding to the first input position and the second input position of the input transmission member, respectively;
 wherein at least one of the input transmission member and the output transmission member rotates around a rotational axis;
 a rotating member engaging member that moves between a rotating member engaging position and a rotating member disengaging position;
 a motion transmitting mechanism for transmitting motion from the rotating member engaging member to the output transmission member;
 a switching mechanism for moving the rotating member engaging member to the rotating member engaging position when the input transmission member is in one of the first input position or second input position and the output transmission member is not in the corresponding first output position or second output position, and for moving the rotating member engaging member to the rotating member disengaging position when the input transmission member is in one of the first input position or second input position and the output transmission member is in the corresponding first output position or second output position; and
 wherein the switching mechanism includes an axially sliding member that moves in the direction of the rotational axis when the input transmission member moves to the one of the first input position or second input position and the output transmission member does not move to the corresponding first output position or second output position.

41. An assisting apparatus for using power from a rotating member to assist the operation of a bicycle transmission comprising:
 a mounting unit;
 an input transmission member coupled to the mounting unit, wherein the input transmission member moves to at least a first input position and a second input position;
 an output transmission member coupled to the mounting unit, wherein the output transmission member moves to at least a first output position and a second output position corresponding to the first input position and the second input position of the input transmission member, respectively;

wherein at least one of the input transmission member and the output transmission member rotates around a rotational axis;

a rotating member engaging member that moves between a rotating member engaging position and a rotating member disengaging position;

a motion transmitting mechanism for transmitting motion from the rotating member engaging member to the output transmission member;

wherein the rotating member engaging member is structured to engage the rotating member and transfer motion from the rotating member to the motion transmitting mechanism when the rotating member engaging member is in the rotating member engaging position;

wherein the rotating member engaging member is structured to disengage from the rotating member and stop transferring motion from the rotating member to the motion transmitting mechanism when the rotating member engaging member is in the rotating member disengaging position;

a switching mechanism for moving the rotating member engaging member to the rotating member engaging position when the input transmission member is in one of the first input position or second input position and the output transmission member is not in the corresponding first output position or second output position, and for moving the rotating member engaging member to the rotating member disengaging position when the input transmission member is in one of the first input position or second input position and the output transmission member is in the corresponding first output position or second output position; and wherein the switching mechanism includes a cam that moves together with the input transmission member and a cam follower that moves with the output transmission member.

* * * * *